US009251745B2

(12) United States Patent
Sprague

(10) Patent No.: US 9,251,745 B2
(45) Date of Patent: Feb. 2, 2016

(54) SYSTEM AND APPARATUS FOR SEE-THROUGH DISPLAY PANELS

(71) Applicant: INNOVEGA INC., Hansville, WA (US)

(72) Inventor: Randall Sprague, Hansville, WA (US)

(73) Assignee: Innovega, Inc., Hansville, WA (US)

( * ) Notice: Subject to any disclaimer, the term of this patent is extended or adjusted under 35 U.S.C. 154(b) by 0 days.

(21) Appl. No.: 14/555,164

(22) Filed: Nov. 26, 2014

(65) Prior Publication Data

US 2015/0084999 A1  Mar. 26, 2015

Related U.S. Application Data

(60) Division of application No. 12/756,984, filed on Apr. 8, 2010, now Pat. No. 8,922,897, which is a continuation-in-part of application No. 12/204,567, filed on Sep. 4, 2008, now Pat. No. 8,520,309.

(51) Int. Cl.
| | |
|---|---|
| *G02B 27/10* | (2006.01) |
| *G09G 3/36* | (2006.01) |
| *G02B 27/01* | (2006.01) |
| *G02C 7/04* | (2006.01) |

(Continued)

(52) U.S. Cl.
CPC .......... *G09G 3/3607* (2013.01); *G02B 27/0172* (2013.01); *G02C 7/04* (2013.01); *G02C 7/086* (2013.01); *G02C 7/101* (2013.01); *G02C 7/102* (2013.01); *G02C 7/12* (2013.01); *G02B 5/1876* (2013.01); *G02B 5/20* (2013.01); *G02B 5/30* (2013.01); *G02C 2202/20* (2013.01); *G09G 2300/0478* (2013.01); *G09G 2320/0626* (2013.01)

(58) Field of Classification Search
CPC .................................................. G02B 27/0172
USPC .......................................................... 359/630
See application file for complete search history.

(56) References Cited

U.S. PATENT DOCUMENTS

| | | | |
|---|---|---|---|
| 3,637,416 A | 1/1972 | Misch et al. | |
| 3,794,414 A | 2/1974 | Wesley | |

(Continued)

FOREIGN PATENT DOCUMENTS

| | | |
|---|---|---|
| FR | 2681702 | 3/1993 |
| GB | 2272980 | 6/1994 |

(Continued)

OTHER PUBLICATIONS

Patent Cooperation Treaty, International Search Report & Written Opinion of the International Search Authority, PCT/US2009/055758, Oct. 29, 2010, 16 pages.

*Primary Examiner* — James Jones
(74) *Attorney, Agent, or Firm* — Viksnins Harris & Padys PLLP

(57) ABSTRACT

Various embodiments of the present invention provide for systems and apparatus directed toward using a contact lens and deflection optics to process display information and non-display information. In one embodiment of the invention, a display panel assembly is provided, comprising: a transparent substrate that permits light to pass through substantially undistorted; a reflector disposed on the transparent substrate; and a display panel aimed toward the reflector and substantially away from a human visual system, wherein the reflector reflects light emitted from the display panel toward the human visual system. The reflector may comprise a narrow band reflector or a polarization reflector.

13 Claims, 23 Drawing Sheets

(51) Int. Cl.
  *G02C 7/08*   (2006.01)
  *G02C 7/10*   (2006.01)
  *G02C 7/12*   (2006.01)
  *G02B 5/18*   (2006.01)
  *G02B 5/20*   (2006.01)
  *G02B 5/30*   (2006.01)

(56) References Cited

U.S. PATENT DOCUMENTS

| | | |
|---|---|---|
| 3,973,837 A | 8/1976 | Page |
| 4,166,255 A | 8/1979 | Graham |
| 4,637,697 A | 1/1987 | Freeman |
| 4,805,988 A | 2/1989 | Dones |
| 5,035,473 A | 7/1991 | Kuwayama et al. |
| 5,044,743 A | 9/1991 | Ting |
| 5,096,285 A | 3/1992 | Silberman |
| 5,100,226 A | 3/1992 | Freeman |
| 5,160,463 A | 11/1992 | Evans et al. |
| 5,331,149 A | 7/1994 | Spitzer et al. |
| 5,369,415 A | 11/1994 | Richard et al. |
| 5,625,372 A | 4/1997 | Hildebrand et al. |
| 5,644,323 A | 7/1997 | Hildebrand et al. |
| 5,748,282 A | 5/1998 | Freeman |
| 5,757,458 A | 5/1998 | Miller et al. |
| 5,786,883 A | 7/1998 | Miller et al. |
| 5,905,561 A | 5/1999 | Lee et al. |
| 5,973,845 A | 10/1999 | Hildebrand et al. |
| 5,980,040 A | 11/1999 | Xu et al. |
| 6,023,372 A | 2/2000 | Spitzer et al. |
| 6,204,974 B1 | 3/2001 | Spitzer |
| 6,217,171 B1 | 4/2001 | Auten et al. |
| 6,284,161 B1 | 9/2001 | Thakrar et al. |
| 6,384,982 B1 | 5/2002 | Spitzer |
| 6,452,572 B1 | 9/2002 | Fan et al. |
| 6,771,423 B2 | 8/2004 | Geist |
| 6,874,888 B1 | 4/2005 | Dudai |
| 7,048,378 B2 | 5/2006 | Chen |
| 7,329,001 B2 | 2/2008 | Benrashid et al. |
| 7,461,937 B2 | 12/2008 | Steffen et al. |
| 8,142,016 B2 | 3/2012 | Legerton et al. |
| 8,441,731 B2 | 5/2013 | Sprague et al. |
| 8,482,858 B2 | 7/2013 | Sprague et al. |
| 8,520,309 B2 | 8/2013 | Sprague et al. |
| 8,786,520 B2 | 7/2014 | Legerton et al. |
| 8,888,279 B2 | 11/2014 | Legerton et al. |
| 8,922,897 B2 | 12/2014 | Sprague et al. |
| 8,922,898 B2 | 12/2014 | Legerton et al. |
| 2003/0038912 A1 | 2/2003 | Broer et al. |
| 2004/0041747 A1 | 3/2004 | Uehara et al. |
| 2005/0088593 A1 | 4/2005 | Yamauchi |
| 2006/0192908 A1 | 8/2006 | Tzschoppe et al. |
| 2006/0203323 A1 | 9/2006 | Tonar et al. |
| 2006/0209405 A1 | 9/2006 | Sinkoff |
| 2006/0279673 A1* | 12/2006 | Tanase et al. ............... 349/67 |
| 2007/0052886 A1 | 3/2007 | Fan |
| 2007/0097066 A1 | 5/2007 | Ward |
| 2007/0177156 A1 | 8/2007 | Mansfield |
| 2007/0291224 A1 | 12/2007 | Lai |
| 2008/0122865 A1 | 5/2008 | Vanmoor |
| 2008/0185193 A1 | 8/2008 | Lin |
| 2009/0059164 A1 | 3/2009 | Steffen et al. |
| 2009/0091613 A1 | 4/2009 | Louwsma et al. |
| 2009/0116096 A1 | 5/2009 | Zalevsky et al. |
| 2009/0189974 A1 | 7/2009 | Deering |
| 2010/0053030 A1 | 3/2010 | Sprague |
| 2010/0053121 A1 | 3/2010 | Sprague |
| 2010/0053549 A1 | 3/2010 | Legerton et al. |
| 2010/0149618 A1 | 6/2010 | Sprague |
| 2010/0265163 A1 | 10/2010 | Legerton et al. |
| 2011/0096100 A1 | 4/2011 | Sprague |
| 2015/0049300 A1 | 2/2015 | Legerton et al. |

FOREIGN PATENT DOCUMENTS

| | | |
|---|---|---|
| GB | 2292248 | 2/1996 |
| WO | WO 91/06031 | 5/1991 |
| WO | WO 01/45080 | 6/2001 |

* cited by examiner

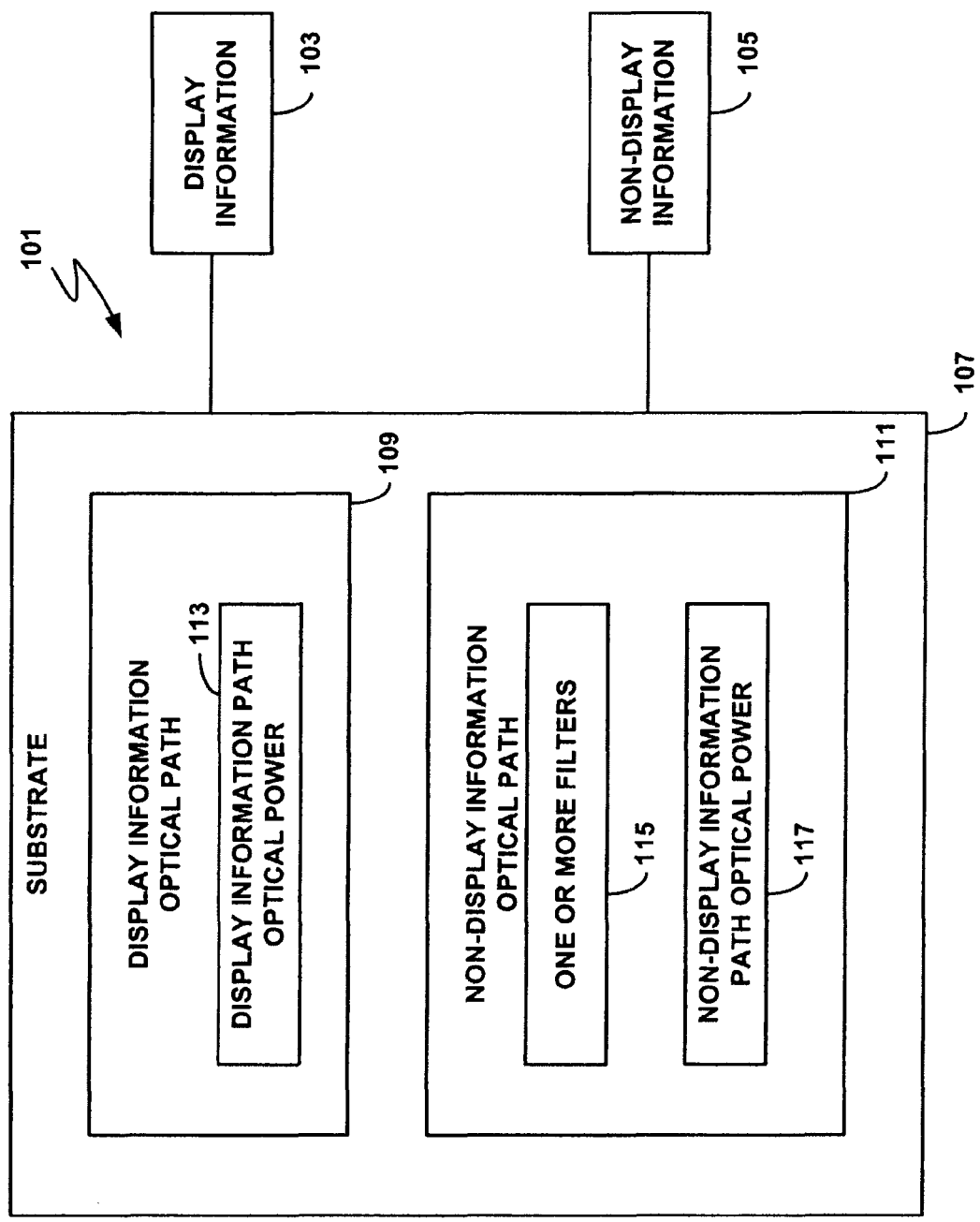

Fig. 4B                    Fig. 4A

SYSTEM AND APPARATUS FOR SEE-THROUGH DISPLAY PANELS

RELATED APPLICATIONS

This application is a divisional of and claims the benefit of U.S. patent application Ser. No. 12/756,984 filed Apr. 8, 2010, which is a continuation-in-part of and claims the benefit of U.S. patent application Ser. No. 12/204,567 filed Sep. 4, 2008 and issued as U.S. Pat. No. 8,520,309, which are incorporated herein by reference in their entirety.

FIELD OF THE INVENTION

The present invention is related to optics and, more specifically, is directed toward optical processing of display information and non-display information using display panels and a dual path contact lens.

DESCRIPTION OF THE RELATED ART

Current systems for optical processing of display information provided by a head-mounted display and non-display information provided by objects other than the head-mounted display may have characteristics that make them unattractive solutions for some applications. The twin requirements of a large field of view and a comfortable eye-to-system distance for the viewer results in multi-component optical systems where the final optical component has a large diameter. Such systems tend to be large, bulky and ill suited for applications where little space is available for processing the display information and the non-display information. For example, such systems are unattractive solutions for processing display and non-display information in a fighter pilot's helmet where the space for the optical system is limited.

BRIEF SUMMARY OF EMBODIMENTS OF THE INVENTION

Various embodiments of the present invention provide systems and apparatus directed toward using a display panel to process display information and non-display information. Further embodiments utilize a display panel in conjunction with a contact lens assembly configured to process the display information.

In one embodiment of the invention, a display panel assembly is provided, comprising: a transparent substrate that permits light to pass through substantially undistorted; a reflector disposed on the transparent substrate; and a display panel aimed toward the reflector and substantially away from a human visual system, wherein the reflector reflects light emitted from the display panel toward the human visual system. The reflector may be a narrow band reflector or a polarization reflector. Additionally, the display panel assembly may further comprise a bandpass filter positioned adjacent to the display panel, wherein the bandpass filter limits bandwidths of light emitted from the display panel toward the narrow band reflector such that substantially no light passes through the narrow band reflector. The display panel may further comprise a polarization filter positioned adjacent to the display panel, wherein the polarization filter limits the polarity of light emitted from the display panel toward the polarization reflector such that substantially no light passes through the first polarization reflector.

In some embodiments, the display panel further comprises a first polarization filter positioned adjacent to the transparent substrate on a side facing opposite the human visual system and a second polarization filter positioned adjacent to the display panel, wherein the second polarization filter limits the polarity of light emitted from the display panel toward the narrow band reflector and the first polarization filter such that substantially no light passes through the first polarization filter.

According to another embodiment, a display panel assembly is provided, comprising: an electro-luminescent display that is transparent; a liquid crystal display that is transparent and segmented, wherein the liquid crystal display is mounted to the electro-luminescent display such that a segment of the liquid crystal display is substantially aligned with one or more pixels within the electro-luminescent display; and a control mechanism that varies a liquid crystal pixel gray level for the segment in order to modify an amount of ambient light passed through the electro-luminescent display. Depending on the embodiment, the electro-luminescent display may be an organic light emitting diode display.

In some embodiments, an algorithm modifies the liquid crystal pixel gray level based on a content of the electro-luminescent display. In other embodiments, an algorithm modifies the liquid crystal pixel gray level based on a brightness of the one or more pixels within the electro-luminescent display. In further embodiments, an algorithm modifies the liquid crystal pixel gray level based on a color of the one or more pixels within the electro-luminescent display. In additional embodiments, an algorithm modifies the liquid crystal pixel gray level based on a gaze angle of an eye of a viewer. In yet further embodiments, an algorithm modifies the liquid crystal pixel gray level based on time periods.

According to an additional embodiment, a display system is provided, comprising: a display assembly disposed on a head-borne apparatus, wherein the display assembly is positioned in close proximity to an eye of a viewer such that the eye is unable to focus on the display assembly unassisted, and the display assembly comprises a transparent display panel having pixels configured without focusing optics, thereby allowing light emitted by the pixels to diverge unfocused; and a contact lens having focusing optics that assists the eye in focusing on light emitted by the pixels of the transparent display panel.

According to another embodiment, a display panel assembly is provided, comprising: transparent display panel having a viewable side, the transparent display panel comprising a display pixel; a polarizer affixed to the viewable side; a transparent pixelated liquid crystal array affixed to the polarizer, the transparent pixelated liquid crystal array comprising at least one liquid crystal pixel that substantially aligns to the display pixel; and a control mechanism configured to electrically control the transparent display and the transparent pixelated liquid crystal array, wherein in a first time period, the control mechanism sets the display pixel to a predetermined brightness level and sets the liquid crystal pixel to a first orientation at every location where a display pixel is set to at least partially illuminated, and in a second time period, the control mechanism sets the display pixel to emit no light and sets the liquid crystal pixel to a second orientation.

In yet another embodiment, a display panel assembly is provided, comprising: a transparent electroluminescent panel having a first electroluminescent panel side and second electroluminescent panel side; a first transparent pixelated liquid crystal array having a first array side and a second array side, wherein a polarizer is affixed to both the first and second array sides, and the second array side with the polarizer is affixed to the first electroluminescent panel side, and; a first transparent liquid crystal shutter panel having a first shutter panel side and a second shutter panel side, wherein the second shutter panel side is affixed to the first array side; and a first control mechanism configured to electrically control the transparent electroluminescent panel, the first transparent pixelated liquid crystal array, and first transparent liquid crystal shutter panel, wherein in a first time period, the control mechanism sets the first transparent liquid crystal shutter to a first polarization orientation and sets the first transparent pixelated liquid crystal array to a first gray level orientation proper for forming a desired image, and in a second time period, the control mechanism turns off the transparent electroluminescent panel and sets the first transparent liquid crystal shutter panel to a second polarization orientation.

In some such embodiments, the display panel assembly further comprises: a second transparent liquid crystal shutter panel affixed to the second electroluminescent panel side, wherein a polarizer is affixed to both sides of the second transparent liquid crystal shutter panel; and a second control mechanism configured to electrically control the second transparent liquid crystal shutter panel, wherein in a third time period, the second transparent liquid crystal shutter panel is set to block light from transmitting, and in a fourth time period, the second transparent liquid crystal shutter panel is set to allow light to transmit. In other such embodiments, the display panel assembly further comprises: a second transparent pixelated liquid crystal array affixed to the second electroluminescent panel side, wherein a polarizer is affixed to both sides of the second transparent pixelated liquid crystal array; and a second control mechanism configured to electrically control the second transparent pixelated liquid crystal array, wherein in a third time period, the second transparent pixelated liquid crystal array is set to a second gray level orientation proper for forming a second desired image, and in a fourth time period, the second transparent pixelated liquid crystal array is set to allow light to transmit.

In some embodiments, the transparent electroluminescent panel may comprise a multi-color array that substantially aligns to pixels in the first transparent pixelated liquid crystal array, or a plurality of colored transparent electroluminescent panels, and the first time period comprises a plurality of sub-periods such that: each colored transparent electroluminescent panel is of a different color, each colored transparent display is turned on during a different sub-period, and the first transparent liquid crystal shutter panel is set to a different orientation during each sub-period.

Accord to a further embodiment, a display panel assembly provided, comprising: a transparent substrate having a semi-reflective surface that reflects light in multiple directions; a transparent cover bonded to the semi-reflective surface using an adhesive having a refraction coefficient similar to that of the transparent substrate; and an image projector configured to project an image onto the semi-reflective surface. The semi-reflective in such an embodiment surface may be a narrow spectral band reflector. In some such embodiments, the image projector comprises a narrow spectral band filter configured to project light that is narrower in wavelength than light reflected from the narrow spectral band reflector. Additionally, the semi-reflective surface may be a polarization reflector that reflects light of a first polarization and passes light of a second polarization. In some such embodiment, the image projector comprises a polarization filter configured to project light of a first polarization.

According to another embodiment, a display panel assembly is provided, comprising: a transparent substrate having a semi-reflective surface that reflects light in multiple directions; a transparent cover bonded to the semi-reflective surface using an adhesive, wherein the adhesive has a refraction coefficient similar to that of the transparent substrate; a polarizer affixed to the transparent cover; a liquid crystal pixel array affixed to the polarizer; and a polarized illumination source having a first polarization orientation, wherein the polarized illumination source illuminates the semi-reflective surface through the liquid crystal pixel array. The semi-reflective surface in some such embodiments may be a narrow spectral band reflector.

According to an additional embodiment, a display panel assembly is provided, comprising: a transparent substrate having a semi-reflective surface that reflects light in multiple directions; a transparent cover bonded to the semi-reflective surface using an adhesive, wherein the adhesive has a refraction coefficient similar to that of the transparent substrate; a light spreading relay configured to relay in a uniform manner light entering from a first relay side onto the semi-reflective surface; a liquid crystal pixel array affixed nearer the viewer a polarizer affixed to the liquid crystal pixel array nearest the viewer; and a polarized illumination source having a first polarization orientation, wherein the polarized illumination source illuminates the semi-reflective surface through the light spreading relay. In some such embodiments, a second polarizer is affixed to the transparent substrate and has a second polarization orientation. In other such embodiments, the semi-reflective surface is a narrow spectral band reflector.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 1A is a block diagram of an example apparatus to receive and process display information and non-display information in accordance with some embodiments of the present invention.

Figure 1B:
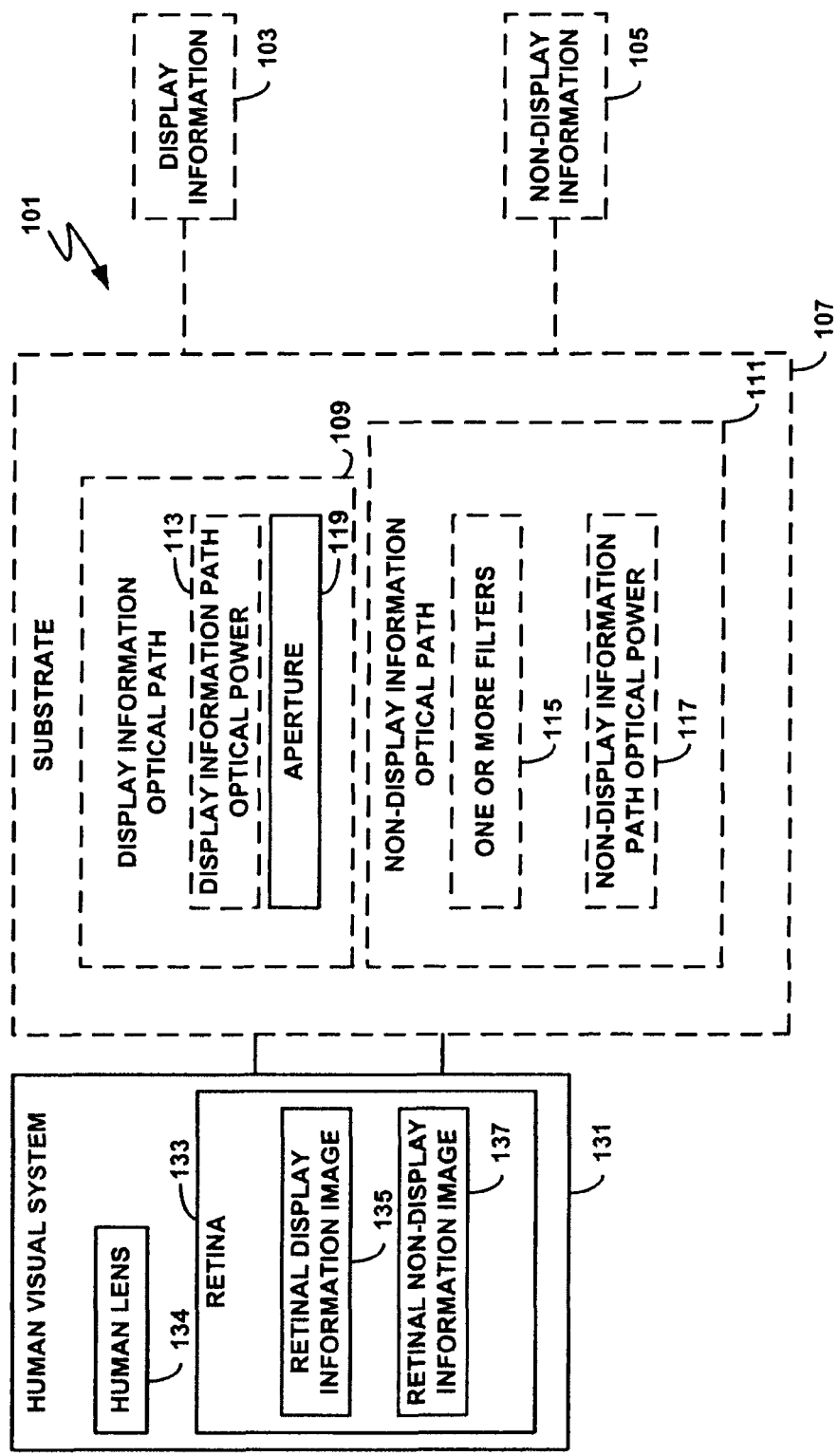
FIG. 1B is a block diagram of the example apparatus (shown in FIG. 1A) coupled to a human visual system in accordance with some embodiments of the present invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward systems and apparatus that use a display panel to provide display information and non-display information to a human eye. In some embodiments, a display panel in accordance with the present invention is configured to combine and process non-display information originating from the real world environment, with display information emanating from the display panel. In further embodiments, the display panel in accordance with the invention is used in conjunction with a contact lens to combine and process non-display information with display information. As will be disclosed by the following description, depending on the embodiment, the display panel of the invention may be positioned off-axis with respect to axial alignment of the human visual system (e.g., human eye) which perceives images produced by the display panel (i.e., light rays emanating from the display panel).

The term human visual system as used in the following description includes the components of the human body that facilitate vision including, but not limited to, the cornea, the retina, the pupil, the iris, the eye lens, sclera, and the optic nerves.

The term substrate as used in the following description includes any material or substance used to form an optical component such as a contact lens. The term zone plate includes an optical component that focuses light by diffraction. The term display information optical path includes the optical path traversed in a substrate by display information. The term non-display information optical path includes the optical path traversed in a substrate by non-display information. For some embodiments, non-display information may include what is perceived in the real world by a human eye. The term optically coupled includes two or more optical components connect by an optical path.

The term non-display information path optical power includes the optical power provided in a substrate for an optical signal passing through the non-display information path. The term substantially zero power includes an optical power that has substantially no effect on an optical signal. The term normal power is the optical power necessary to provide correction in an optical system, such as a human visual system, for defects in the optical system. The term close power is the optical power necessary to provide correction in an optical system, such as a human visual system, for viewing at a close distance.

The term electromagnetic radiation includes energy in the form of transverse electric and magnetic waves. The term electromagnetic radiation includes electromagnetic radiation in the visible spectrum. The term illuminating includes directing or transmitting electromagnetic radiation to a target.

The term filter includes apparatus or methods for selectively transmitting electromagnetic radiation. The term characteristic feature includes detectable traits, such as narrow bandwidth or polarization, by which signals can be distinguished.

The term notch filter includes a filter that blocks electromagnetic radiation over a substantially continuous narrow band of frequencies. The term non-display path notch filter includes a notch filter included in the non-display path of a substrate.

The term bandpass filter includes a filter that transmits electromagnetic radiation over a substantially continuous but finite band of frequencies. The term display path bandpass filter includes a bandpass filter included in the display path of a substrate.

The term polarizing filter includes a filter that polarizes electromagnetic radiation. The term display path polarizing filter includes a polarizing filter included in the display information path of a substrate. The term non-display path polarizing filter includes a polarizing filter included in the non-display information path of a substrate. The term shutter includes a controllable polarizing filter. The term substantially opaque filter includes a filter that blocks all or nearly all of the information received by the filter.

The term display includes any apparatus capable of generating information in the form of electromagnetic radiation. The term organic light emitting diode display includes one or more light-emitting diodes whose light emitting layer includes a film of one or more organic compounds. The term display information includes information provided by a display.

The term controllable optical materials includes materials whose optical properties, such as opacity, can be controlled. The term photochromic material includes materials whose optical properties can be controlled by an optical signal. The term electrochromic material includes an optical material whose properties can be controlled by an electrical signal. The term optical material activation signal includes signals to control the optical properties of a controllable optical material.

The term a pattern of pixel sites includes the organization of pixel sites on a substrate. The term substantial transparent pixel unit includes a portion of a display that transmits electromagnetic radiation generated outside the display. The term checkerboard pattern includes an alternating pattern similar to the pattern of a checkerboard.

In some embodiments, as illustrated and described herein, information provided by a head-mounted display, referred to as display information, and information provided by objects other than the head-mounted display, referred to as non-display information, are received at a contact lens included in a human visual system. A head-mounted display may include an organic light emitting diode display to provide the display information. The contact lens in combination with the human visual system provides images of the display information and the non-display information to the retina of the human visual system. The display information may include, for example, text information, non-text information or other visual information. The non-display information may include, for example, landscape information, non-landscape information, and other visual information.

The contact lens includes a display information optical path and a non-display information optical path. The display information optical path provides a contact lens transmission path between the head-mounted display and the human visual system for the display information transmitted by the head-mounted display. The display information optical path forms a substantially cylindrical central region of the contact lens. The display information optical path in the contact lens can provide power to assist the human visual system in focusing objects positioned close to the human lens.

The non-display information optical path provides a contact lens transmission path between the source of the non-display information and the human visual system for the non-display information. The non-display information optical path forms a substantially annular ring surrounding the cylindrical central region of the display information optical path. A filter is included in the non-display information optical path to substantially block display information from being transmitted through the non-display information optical path. The non-display information optical path in the contact lens may provide correction for defects, such as nearsightedness, farsightedness, and astigmatism in the human visual system.

The display information and the non-display information may be polarized to different polarizations to provide for distinguishing between the display information and the non-display information. Polarizing the display information and the non-display information enables independent processing of the display information and non-display information at the contact lens and enables tune-domain multiplexing in the transmission of the display information and the non-display information to the contact lens. The time-domain multiplexed display information and non-display information when processed by the human visual system are perceived as a single image. Further detailed description of these and other embodiments is provided below.

FIG. 1A shows a block diagram of an apparatus 101 to receive and process display information 103 and non-display information 105 in accordance with some embodiments. The apparatus 101 includes a substrate 107 including a display information optical path 109 to receive the display information 103 and including a non-display information optical path 111 to receive the non-display information 105. The display information optical path 109 includes a display information path optical power 113. The non-display information optical path 111 includes one or more filters 115 and a non-display information path optical power 117.

The substrate 107 is not limited to being formed from a particular material or combination of materials. Materials suitable for use in forming optical components, such as lenses, may be used in forming the substrate 107. Exemplary materials suitable for use in forming the substrate 107 include gels, such as silicone hydrogels, glasses, plastics, and polymers, such as polymethyl methacrylate and polymacon. The substrate 107 is not limited to a particular type of optical component. In some embodiments, the substrate 107 includes a substrate or blank suitable for forming one lens, such as a contact lens. In some embodiments, the substrate 107 includes one or more optical components or lenses, such as focusing lenses, formed from one or more optical materials. In some embodiments, the substrate 107 is formed from a flexible material conformable to the shape of a human cornea. In some embodiments, the substrate 107 is formed by filling a contact lens mold with one or more liquid polymers.

The display information 103 includes electromagnetic radiation, such as visible light, having at least one characteristic feature lacking in the non-display electromagnetic radiation of the non-display information 105. For example, in some embodiments, the display information 103 includes electromagnetic radiation having a narrow spectral bandwidth while the non-display information 105 includes electromagnetic radiation having a broad spectral bandwidth. Narrow spectral bandwidth and broad spectral bandwidth are relative terms. In some embodiments, for two signals, the signal having the narrower spectral bandwidth information is the signal having a narrow spectral bandwidth and the signal having the broader spectral bandwidth information is the signal having a broad spectral bandwidth. In some embodiments, narrow spectral bandwidth information includes information having a bandwidth of between about a few nanometers and a few tens of nanometers. In some embodiments, broad spectral bandwidth information includes information having a bandwidth greater than about a few tens of nanometers. Thus, the non-display electromagnetic radiation having a broad spectral bandwidth lacks the characteristic feature—narrow spectral bandwidth—included in the display information 103.

As a second example, in some embodiments, the display information 103 includes electromagnetic radiation having a display information polarization, such as right-handed circular polarization, and the non-display information 105 includes unpolarized information. Thus, the non-display information 105 including the non-display electromagnetic radiation having the unpolarized information lacks the characteristic feature—right handed circular polarization—included in the display information 103.

The display information optical path 109 is included in the substrate 107 and is formed from an optical material or combination of materials. The display information optical path 109 is not limited to being formed from a particular optical material or combination of materials. Materials suitable for use in forming the substrate 107 are suitable for use in forming the display information optical path 109. The materials used to form the display information optical path 109 may differ from the one or more materials used to form the substrate 107.

In operation, the display information optical path 109 receives and transmits electromagnetic information, such as the display information 103. When coupled to a human visual system (as shown in FIG. 1B), the display information optical path 109 receives the display information 103 and assists the human visual system to substantially focus the display information 103 to a retina in the human visual system.

The non-display information optical path 111 is included in the substrate 107 and is formed from an optical material or combination of materials. The non-display information optical path 111 is not limited to being formed from a particular optical material or combination of materials. Materials suitable for use in forming the substrate 107 are suitable for use in forming the non-display information optical path 111. The materials used to form the non-display information optical path 111 may differ from the one or more materials used to form the substrate 107.

In operation, the non-display information optical path 111 receives the non-display information 105 and when coupled to a human visual system (as shown in FIG. 1B) substantially focuses the non-display information 105 to a retina in the human visual system. The non-display information 105 includes any information, such as visible objects, not included in the display information 103. In some embodiments, the non-display information 105 is provided from objects more distant from the human visual system than the source of the display information 103. For example, in some embodiments, the display information 103 is provided to a human visual system from a head-mounted display located between about 5 millimeters and about 200 millimeters from the cornea, and the non-display information 105 is provided to the human visual system from a source located at a distance of greater than about 200 millimeters from the cornea.

The one or more filters 115 included in the non-display information optical path 111 substantially block the display information 103 while substantially transmitting the non-display information 105. Each of the one or more filters 115 is sensitive to a physical characteristic, such as wavelength, frequency, or polarization, of the display information 103. Thus, the one or more filters 115 may include any filter or combination of filters or other optical components capable of substantially blocking the display information 103 while substantially transmitting the non-display information 105.

Optical power is the degree to which a lens or mirror converges or diverges light or electromagnetic radiation. A lens or mirror having substantially zero optical power neither converges nor diverges electromagnetic radiation. Normal power is the power necessary to provide correction in an optical system, such as a human visual system, for defects in the optical system. For example, normal power includes a power to correct for nearsightedness, farsightedness, or astigmatism in a human visual system. In some embodiments, a normal power is between about 0.25 and about 10 diopters.

Close power is the power necessary to provide correction in an optical system, such as a human visual system, for viewing at a close distance. In a human visual system, a close distance is a distance of less than about 250 millimeters. For objects closer than about 250 millimeters, the human visual system cannot form a sharp image on the retina. A focusing lens can provide close power to assist a human visual system in viewing objects at distances of less than about 250 millimeters. In some embodiments, the close power is between about 5 and about 200 diopters.

In some embodiments, the apparatus 101 includes combinations of optical powers. In some embodiments, the display information path optical power 113 includes substantially zero power and the non-display information path optical power 117 includes substantially zero power. In other embodiments, the display information path optical power 113 includes substantially zero power and the non-display information path optical power 117 includes a normal power. In further embodiments, the display information path optical power 113 includes a close power and the non-display information path optical power 117 includes substantially zero power. In additional embodiments, the display information path optical power 113 includes a close power and the non-display information path optical power 117 includes normal power.

FIG. 1B shows a block diagram of the apparatus 101 (shown in FIG. 1A) coupled to a human visual system 131 in accordance with some embodiments. The apparatus 101 (dashed lines) includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more filters 115 and the non-display information path optical power 117.

In some embodiments, the display information optical path 109 has an aperture 119. The aperture 119 may be sized to assist in focusing the display information 103. In some embodiments, the aperture 119 is sized to increase the depth of focus in the display information optical path 109. In some embodiments, the aperture 119 has a diameter of about one millimeter.

In operation, the display information optical path 109 and the non-display information optical path 111 assist the human visual system 131 in forming a focused image of the display information 103 and a focused image of the non-display information 105 on a retina 133. The display information optical path 109 in cooperation with the human visual system 131, including the human lens 134, substantially focuses the display information 103 to the retina 133 to form retinal display information image 135. The non-display information optical path 111 in cooperation with the human visual system 131, including the human lens 134, substantially focuses the non-display information 105 to the retina 133 to form retinal non-display information image 137. At least one of the one or more filters 115 in the non-display information optical path 111 substantially blocks the display information 103 from entering the human visual system 131 from the non-display information optical path 111.

Figure 1C:
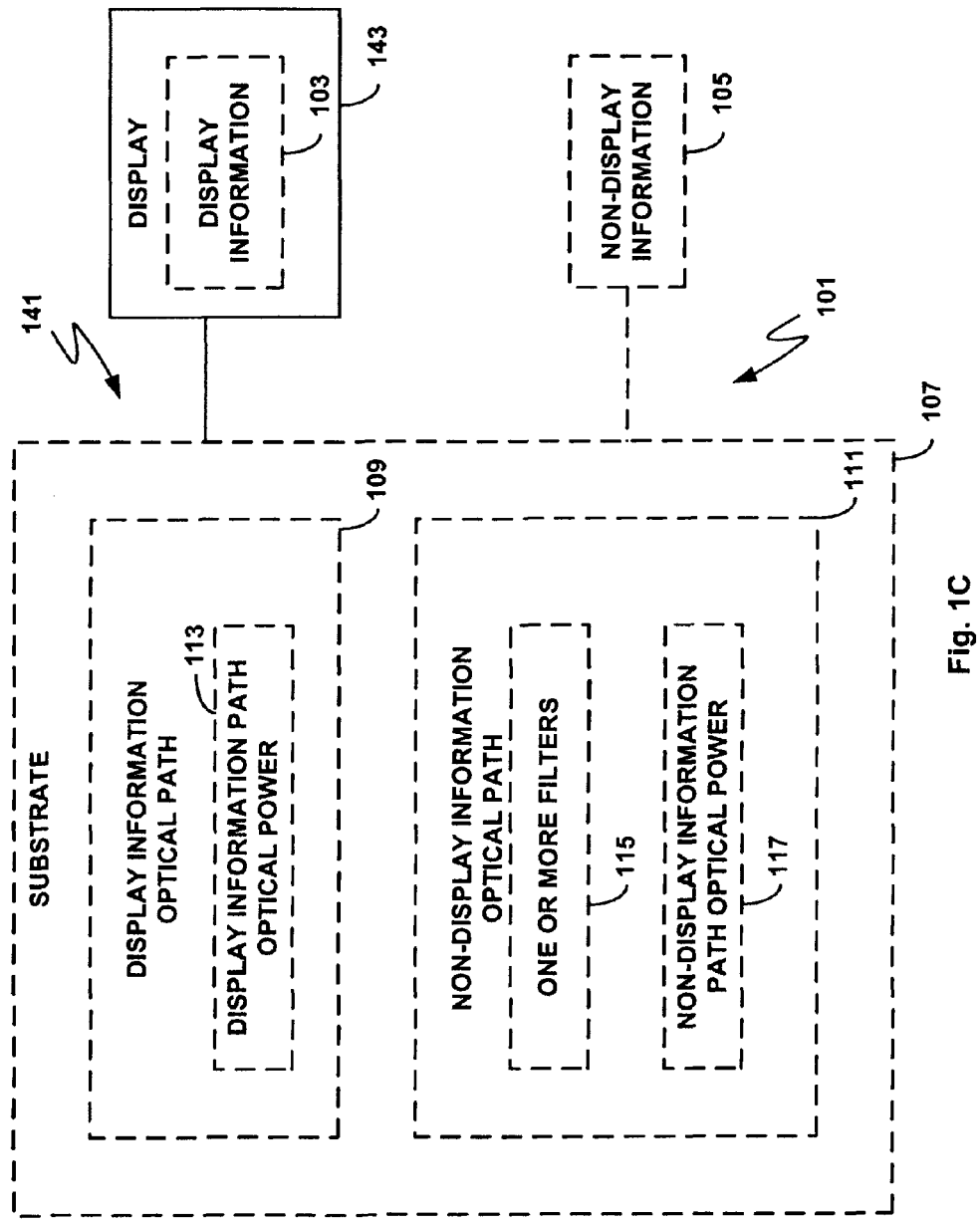
FIG. 1C is a block diagram of an example apparatus including the apparatus (shown in FIG. 1A), and further including a display to provide the display in accordance with some embodiments of the present invention.

FIG. 1C shows a block diagram of an apparatus 141 including the apparatus 101 (shown in FIG. 1A), and further including a display 143 to provide the display information 103 in accordance with some embodiments. The apparatus 101 (dashed lines) includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more filters 115 and the non-display information path optical power 117.

In some embodiments, the display information 103 includes information provided by the display 143. The display 143 includes any device or system that provides information in the form of electromagnetic radiation, such as visible light. For example, in some embodiments, the display information 103 is provided by a device including a single two-state source of visible light.

The display 143 is not limited to a particular type of display. In some embodiments, the display 143 includes microdisplays and other small displays, such as displays having a thickness of between about 100 microns and about two millimeters, flat screen displays, such as liquid crystal displays, and cathode ray tube displays. In some embodiments, the display 143 is mounted in an eyeglass frame. In operation, in some embodiments, the distance between the display and a human cornea is between about 5 millimeters and about 200 millimeters.

The display information 103 provided by the display 143 may include a characteristic feature related to the wavelength of the display information 103. In some embodiments, the display information 103 provided by the display 143 includes information having a narrow spectral bandwidth. Exemplary displays that provide the display information 103 having a narrow spectral bandwidth include organic light emitting diode displays and electroluminescent displays.

The display 143 is not limited to providing the display information 103. In some embodiments, the display 143 is substantially occluded, partially occluded, or substantially transparent. For a partially occluded or substantially transparent display, the display 143 may transmit the non-display information 105 in addition to providing the display information 103. An organic light emitting diode display is an exemplary display capable of providing substantially transparent, partially occluded, and substantially occluded operation.

Figure 1D:
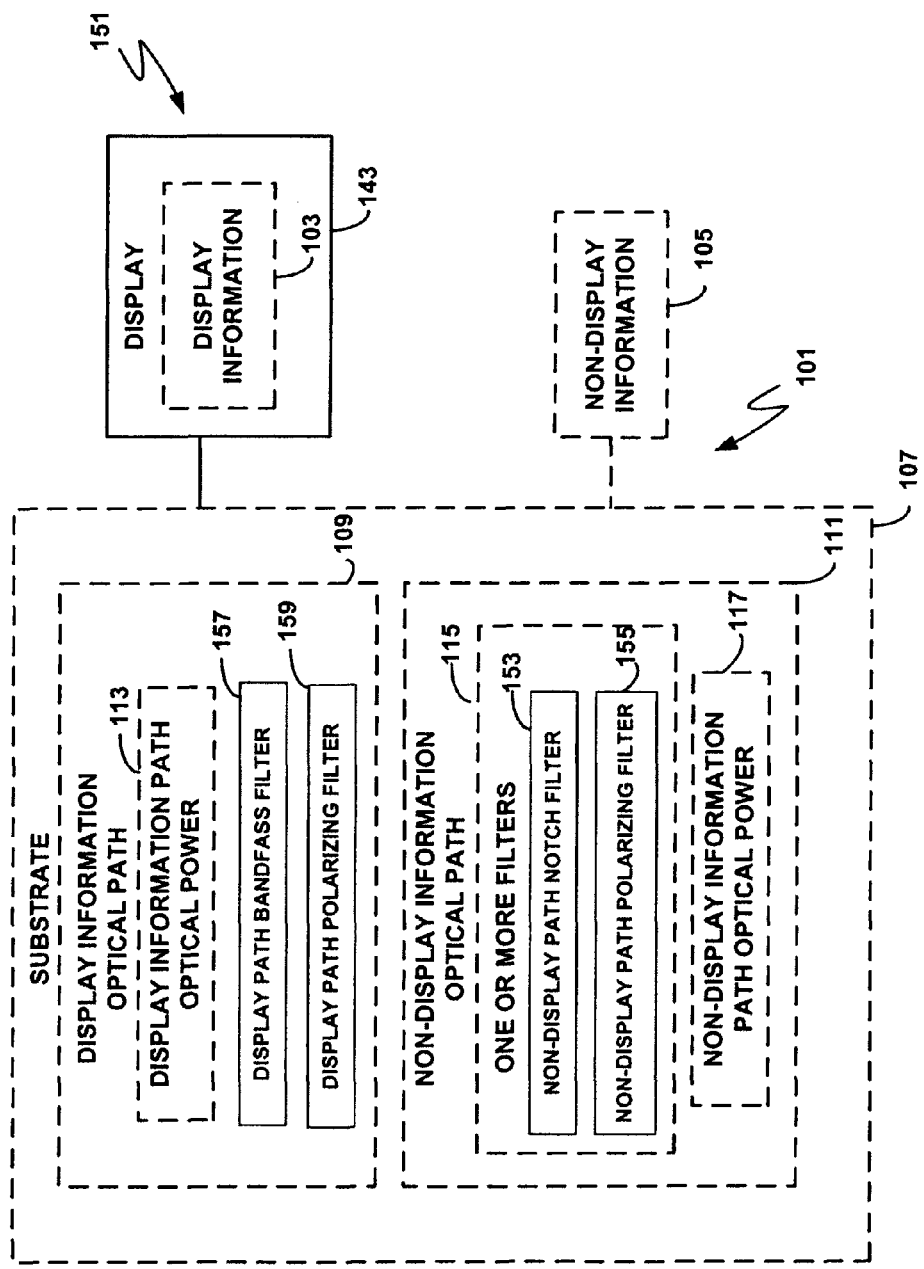
FIG. 1D is a block diagram of an example apparatus including the apparatus (shown in FIG. 1A), wherein at least one of the one or more filters (shown in FIG. 1A) includes a non-display path notch filter or a non-display path polarizing filter and further including the display (shown in FIG. 1C) to provide the display information (shown in FIG. 1A) in accordance with some embodiments of the present invention.

FIG. 1D shows a block diagram of an apparatus 151 including the apparatus 101 (shown in FIG. 1A), wherein at least one of the one or more filters 115 includes a non-display path notch filter 153 or a non-display path polarizing filter 155 and further including the display 143 to provide the display information 103 in accordance with some embodiments. The apparatus 101 (dashed lines) includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more filters 115 and the non-display information path optical power 117. In some embodiments, the display information optical path includes a display path bandpass filter 157. In other embodiments, the display information optical path includes a display path polarizing filter 159.

The non-display path notch filter 153 is selected to substantially block the display information 103 in the non-display information optical path 111. In some embodiments, the non-display path notch filter 153 is selected to block at least about 90% of the energy included in the display information 103. Blocking less than about 90% of energy included in the display information 103 may result in blurring of the display information 103 and the non-display information 105. The non-display path notch filter 153 is not limited to a particular type of notch filter. In some embodiments, the non-display path notch filter 153 includes a thin film interference filter, such as a rugate filter. Notch filters, such as the non-display path notch filter 153, are formed by periodically varying the refractive index in each of a plurality of discrete thin film layers included in a contact lens. Microlithographic processes can be applied to each of the plurality of discrete thin film layers to pattern the notch filters. The plurality of discrete thin film layers may be introduced into the contact lens during the molding of the lens.

In operation, the non-display path notch filter 153 is included in the non-display information optical path 111 to block narrow bandwidth electromagnetic radiation included in the display information 103. If the non-display information 105 includes broad spectral bandwidth electromagnetic radiation, the non-display path notch filter 153 has substantially no effect on the non-display information 105. The non-display information 105 passes through the non-display information optical path 111 substantially unchanged.

In some embodiments, the frequencies to be blocked by the non-display path notch filter 153 include the primary colors included in the spectrum of the display information 103. For example, for the display information 103 having primary colors red, green, and blue, the one or more filters 115 are selected to substantially block narrow spectrum red, green, and blue. The transmission curve to substantially block narrow spectrum red, green, and blue includes "notches" or a transmission coefficient of substantially zero at the one or more bands of frequencies to be blocked, narrow spectrum red, green, and blue. In some embodiments, the "notches" have a bandwidth that blocks a band of frequencies, such as, for example, a band of frequencies having a narrow spectrum of between about two and about thirty nanometers, centered on each of the primary colors, red, green, and blue.

The non-display path polarizing filter 155 is selected to substantially block the display information 103 in the non-display information optical path 111. The non-display path polarizing filter 155 is not limited to a particular type of polarizing filter. In some embodiments, the non-display path polarizing filter 155 includes a filter to substantially block right-handed circularly polarized radiation. In other embodiments, the non-display path polarizing filter 155 is selected to substantially block left-handed circularly polarized electromagnetic radiation. In further embodiments, the non-display path polarizing filter 155 is selected to substantially block linearly polarized electromagnetic radiation. Pixelated micro-wires and birefringent polymers are suitable for use in forming linear polarizers for use in forming polarizing filters, such as the non-display path polarizing filter 155. Circular polarizers are formed by adding a quarter wave-plate retarder in series with a linear polarizer.

In operation, the non-display path polarizing filter 155 is included in the non-display information optical path 111 to block polarized electromagnetic radiation included in the display information 103. For example, if the display information 103 includes left-handed circularly polarized electromagnetic radiation and the non-display information 105 includes right-handed circularly polarized electromagnetic radiation, the non-display path polarizing filter 155 is selected to substantially block the left-handed circularly polarized electromagnetic radiation while having substantially no effect on the right-handed circularly polarized electromagnetic radiation of the non-display information 105. The non-display information 105 passes through the non-display information optical path 111 substantially unchanged.

The display path bandpass filter 157 is selected to substantially block the non-display information 105 in the display information optical path 109. The display path bandpass filter 157 is not limited to a particular type of bandpass filter. In some embodiments, the display path bandpass filter 157 includes a thin film interference filter, such as a rugate filter. Bandpass filters, such as the display path bandpass filter 157, are formed by varying the refractive index in each of a plurality of thin films to selectively pass the desired wavelength bands and including the plurality of discrete thin film layers in a contact lens. Microlithographic processes can be applied to the plurality of thin films to pattern the bandpass filters. The plurality of discrete thin film layers may be introduced into the contact lens during the molding of the lens.

In operation, the display path bandpass filter 157 included in the display information optical path 109 is selected to substantially block broad spectral bandwidth electromagnetic radiation included in the non-display information 105. If the display information 103 includes narrow spectral bandwidth electromagnetic radiation substantially matched to the passband of the display path bandpass filter 157, the display path bandpass filter 157 has substantially no effect on the display information 103. The display information 103 passes through the display information optical path 109 substantially unchanged.

The display path polarizing filter 159 is selected to substantially block the non-display information 105 in the display information optical path 109. The display path polarizing filter 159 is not limited to a particular type of polarizing filter. In some embodiments, the display path polarizing filter 159 includes a linearly polarized filter.

In operation, the display path polarizing filter 159 is included in the display information optical path 109 to substantially block electromagnetic radiation included in the non-display information 105. If the display information 103 includes right-handed circularly polarized electromagnetic radiation and the display path polarizing filter 159 is selected to transmit right-handed circularly polarized electromagnetic radiation, the display path polarizing filter 159 has substantially no effect on the display information 103. The display information 103 passes through the display information optical path 109 substantially unchanged.

In some embodiments, in operation the apparatus 151 processes a combination of spectral bandwidths and polarizations in the display information 103 and the non-display information 105. In some embodiments, the display information 103 includes display electromagnetic radiation having a narrow spectral bandwidth and the non-display information 105 includes non-display electromagnetic radiation having a broad spectral bandwidth. In other embodiments, the display information 103 includes display electromagnetic radiation having a display information polarization and the non-display information 105 includes non-display electromagnetic radiation having a non-display information polarization. In further embodiments, the display information 103 includes display electromagnetic radiation having a narrow spectral bandwidth and a display information polarization and the non-display information 105 includes non-display electromagnetic radiation having a broad spectral bandwidth. In additional embodiments, the display information 103 includes display information including display electromagnetic radiation having a narrow spectral bandwidth and a display information polarization and the non-display information 105 including non-display electromagnetic radiation having a broad spectral bandwidth and a non-display information polarization.

Figure 1E:
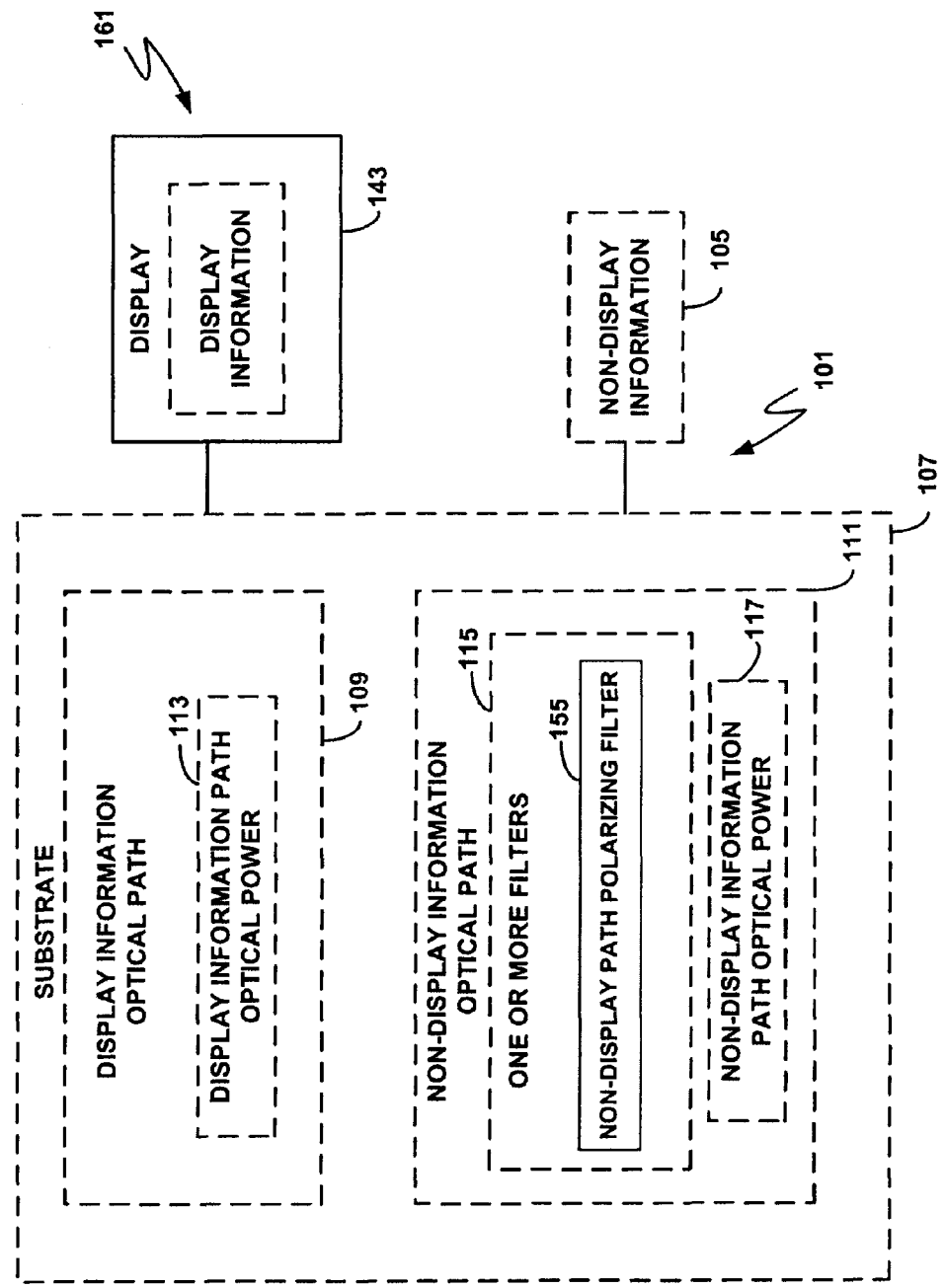
FIG. 1E is a block diagram of an example apparatus including the apparatus (shown in FIG. 1A), wherein the one or more filters include a non-display path polarizing filter (shown in FIG. 1D) and further including the display (shown in FIG. 1C) in accordance with some embodiments of the present invention.

FIG. 1E shows a block diagram of an apparatus 161 including the apparatus 101 (shown in FIG. 1A), wherein the one or more filters 115 includes the non-display path polarizing filter 155 (shown in FIG. 1D) and further including the display 143 (shown in FIG. 1C in accordance with some embodiments The apparatus 101 includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more filters 115 and the non-display information path optical power 117. The display information 103 includes electromagnetic radiation having a display information polarization. The non-display information 105 includes non-display electromagnetic radiation having a non-display information polarization.

The non-display path polarizing filter 155 is selected to block the display information 103. In some embodiments, the display information 103 includes electromagnetic radiation having the display information polarization. To block the display information 103, the non-display path polarizing filter 155 is selected to block electromagnetic radiation having the display information polarization. In some embodiments, the non-display information 105 includes the non-display electromagnetic radiation having the non-display information polarization. The non-display path polarizing filter 155 is selected to pass the non-display electromagnetic radiation having the non-display information polarization.

Figure 2A:
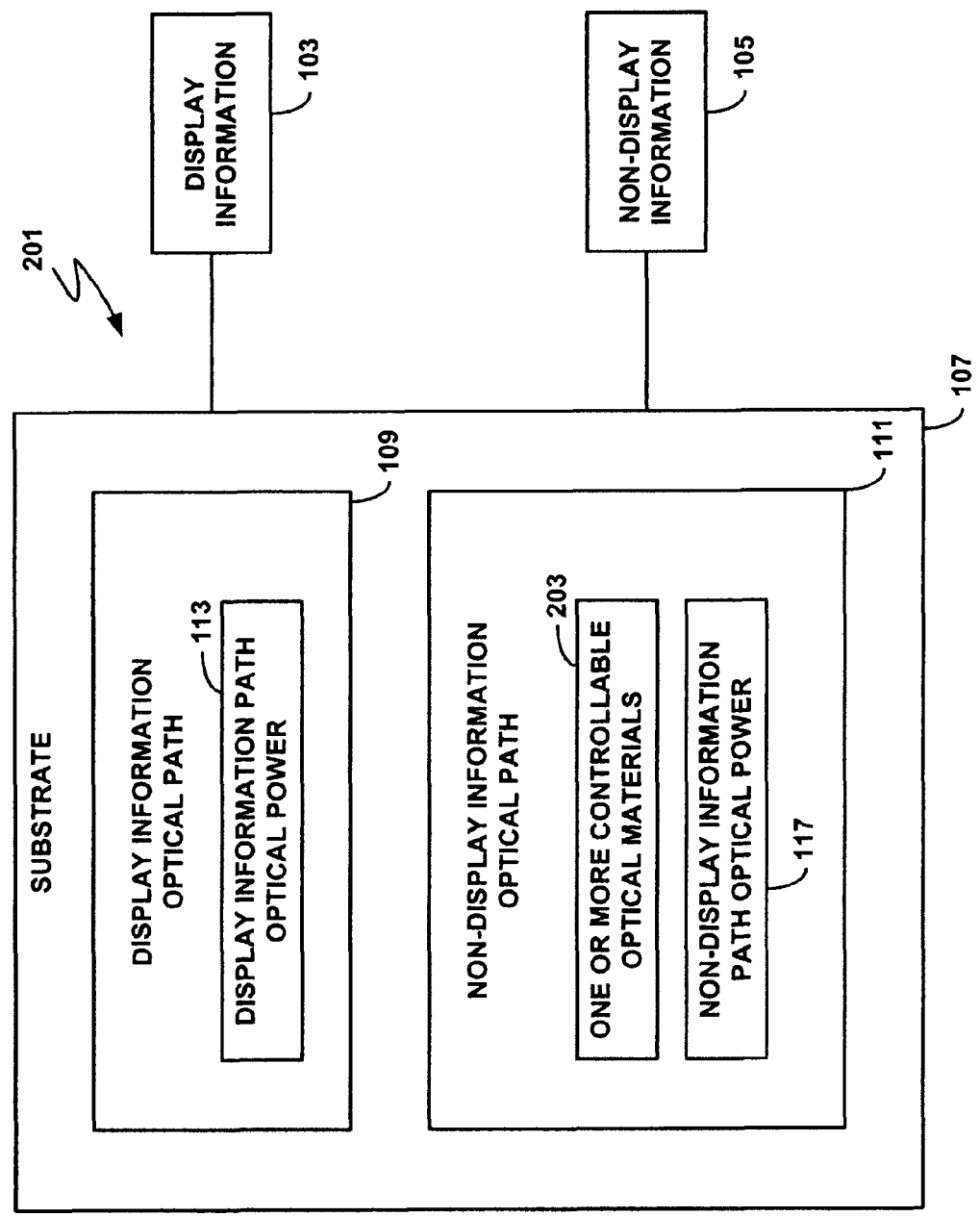
FIG. 2A is a block diagram of an example apparatus to receive and process the display information and the non-display information in accordance with some embodiments of the present invention.

FIG. 2A shows a block diagram of an apparatus 201 to receive and process the display information 103 and the non-display information 105 in accordance with some embodiments. The apparatus 201 includes the substrate 107 including the display information optical path 109 to receive the display information 103 and including the non-display information optical path 111 to receive the non-display information 105.

The display information optical path 109 includes the display information path optical power 113. The non-display information optical path 111 includes one or more controllable optical materials 203 and the non-display information path optical power 117.

The one or more controllable optical materials 203 include materials having one or more controllable optical properties. In some embodiments, the one or more controllable optical materials 203 include photochromic materials. The controllable optical properties, such as opacity, may be controlled by providing the photochromic material with an electromagnetic signal, such as an optical signal, for example, to increase or decrease the opacity of the photochromic material.

In some embodiments, the one or more controllable optical materials 203 include an electrochromic material. The one or more controllable optical properties, such as opacity, may be controlled by providing the electrochromic material with an electromagnetic signal, such as a radio frequency signal, for example, to increase or decrease the opacity of the electrochromic material.

In operation, the one or more controllable optical materials 203 included in the non-display information optical path 111 block or transmit information in the non-display information optical path 111. When at least one of the one or more controllable optical materials 203 is set to block information in the non-display information optical path 111, substantially only display information 103 in the display information optical path 109 passes through the substrate 107.

Neither the display information path optical power 113 nor the non-display information path optical power 117 is limited to a particular power. In some embodiments, the apparatus 201 includes a combination of optical powers. In some embodiments, the display information path optical power 113 includes substantially zero power and the non-display information path optical path power 117 includes substantially zero power. In other embodiments, the display information path optical power 113 includes substantially zero power and the non-display information path optical power 117 includes a normal power. In further embodiments, the display information path optical power 113 includes a close power and the non-display information path optical power 117 includes substantially zero power. In additional embodiments, the display information path optical power 113 includes a close power and the non-display information path optical power 117 includes normal power.

Figure 2B:
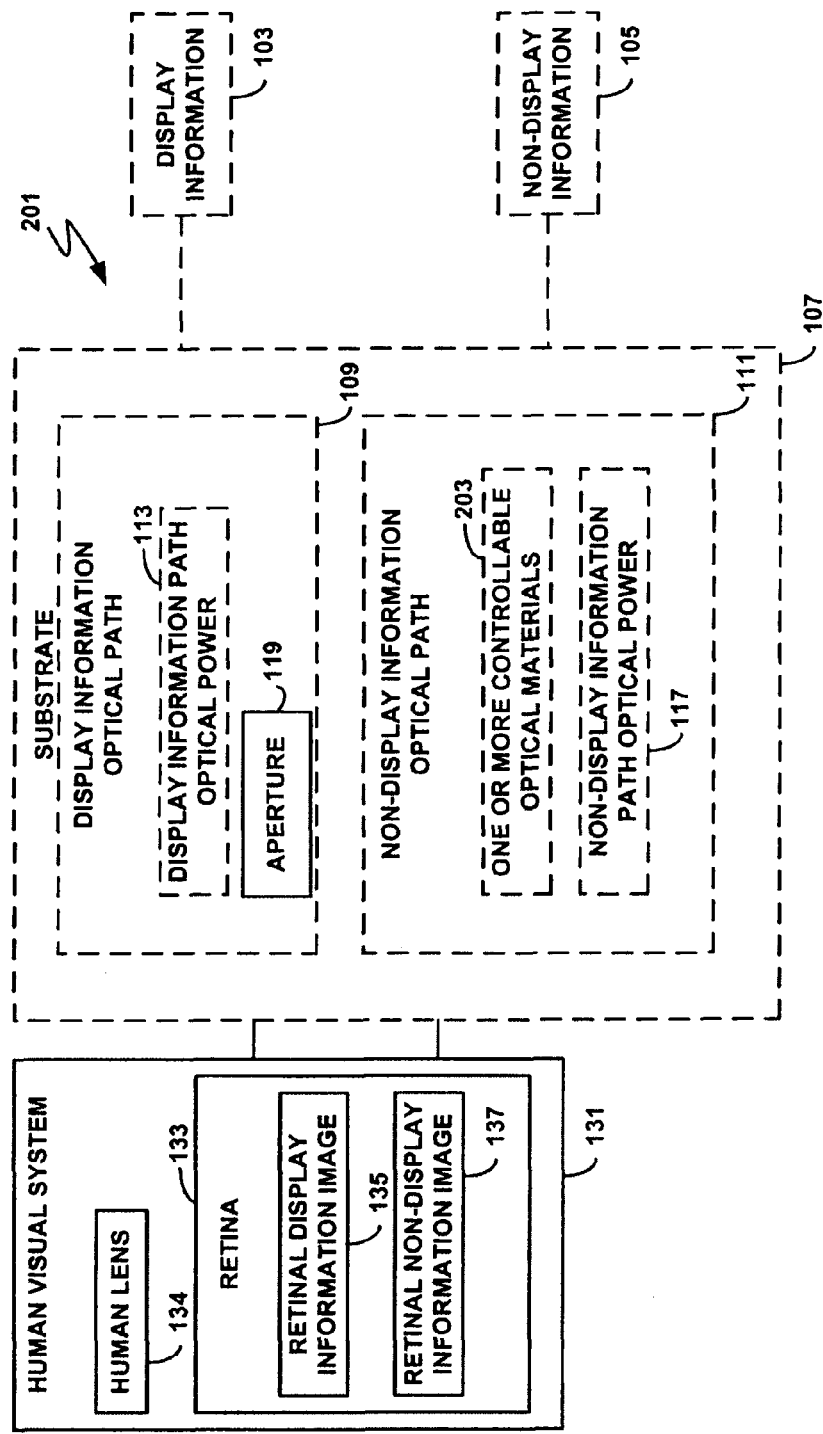
FIG. 2B is a block diagram of the example apparatus (shown in FIG. 2A) coupled to the human visual system (shown in FIG. 1B) in accordance with some embodiments of the present invention.

FIG. 2B shows a block diagram of the apparatus 201 (shown in FIG. 2A) coupled to the human visual system 131 in accordance with some embodiments. The apparatus 201 (dashed lines) includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more controllable optical materials 203 and the non-display information path optical power 117.

In some embodiments, the display information optical path 109 has an aperture 119. The aperture 119 may be sized to assist in focusing the display information 103. In some embodiments, the aperture 119 is sized to increase the depth of focus in the display information optical path 109. In some embodiments, the aperture 119 has a diameter of about one millimeter.

In operation, the display information optical path 109 and the non-display information optical path 111 assist the human visual system 131 in forming a focused image of the display information 103 at the retina 133 and a focused image of the non-display information 105 at the retina 133. The display information optical path 109 in cooperation with the human visual system 131, including the human lens 134, substantially focuses the display information 103 at the retina 133 to form a retinal display information image 135. The non-display information optical path 111 in cooperation with the human visual system 131, including the human lens 134, substantially focuses the non-display information 105 at the retina 133 to form a retinal non-display information image 137. At least one of the one or more controllable optical materials 203 in the non-display information optical path 111 substantially blocks the display information 103 from entering the human visual system 131 from the non-display information optical path 111.

Figure 2C:
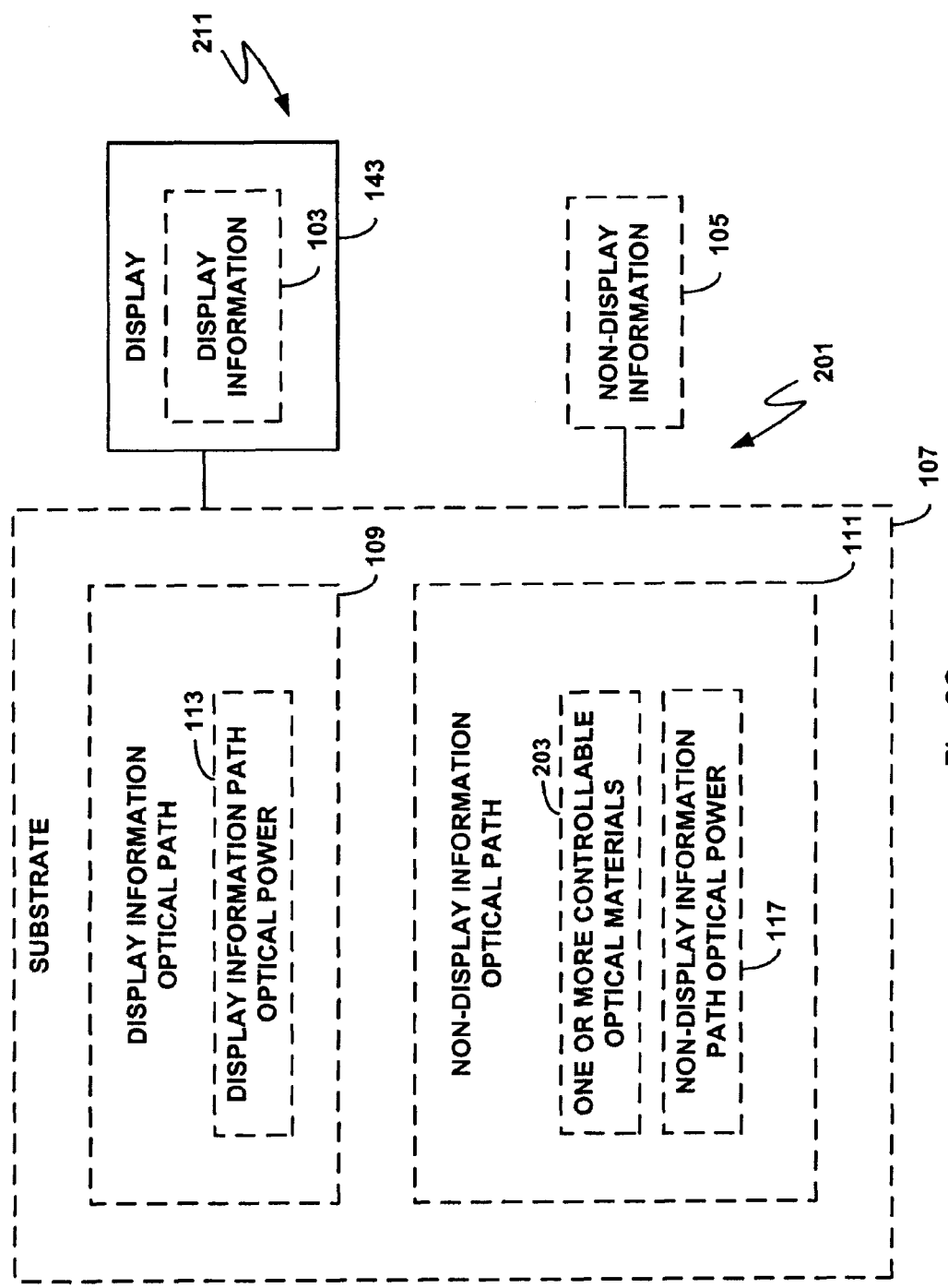
FIG. 2C is a block diagram of an example apparatus including the apparatus (shown in FIG. 2A), and further including the display (shown in FIG. 1C) to provide the display information in accordance with some embodiments

FIG. 2C shows a block diagram of an apparatus 211 including the apparatus 201 (shown in FIG. 2A), and further including the display 143 (shown in FIG. 1C) to provide the display information 103 in accordance with some embodiments. The apparatus 201 (dashed lines) includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more controllable optical materials 203 and the non-display information path optical power 117. In some embodiments, the display information 103 includes information provided by the display 143.

Figure 2D:
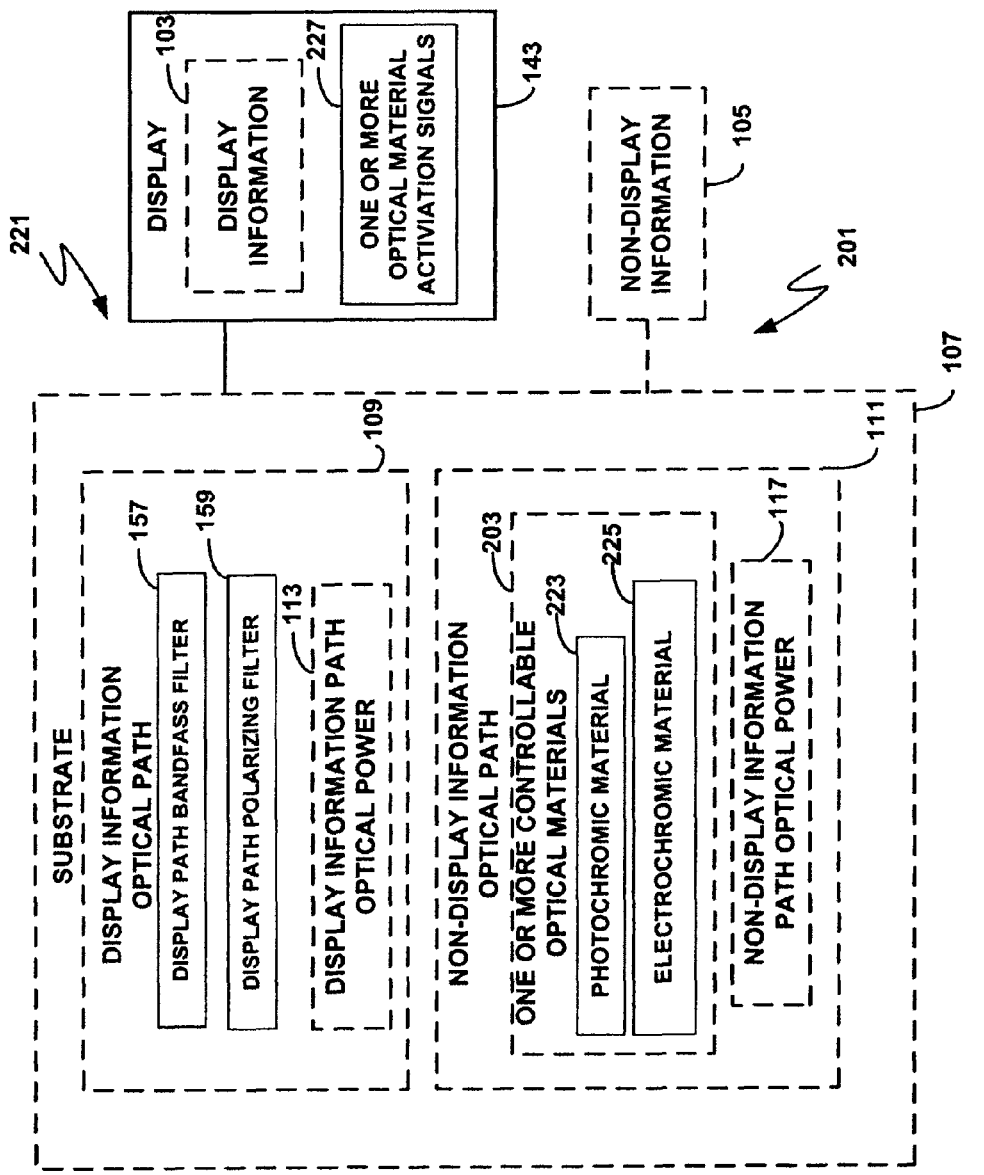
FIG. 2D is a block diagram of an example apparatus including the apparatus (shown in FIG. 2A), wherein at least one of the one or more controllable optical materials includes a photochromic material or an electrochromic material and further including the display (shown in FIG. 1C) to provide the display information and one or more optical material activation signals in accordance with some embodiments of the present invention.

FIG. 2D shows a block diagram of an apparatus 221 including the apparatus 201 (shown in FIG. 2A), wherein at least one of the one or more controllable optical materials 203 includes a photochromic material 223 or an electrochromic material 225 and further including the display 143 to provide the display information 103 and one or more optical material activation signals 227 in accordance with some embodiments. The apparatus 201 (dashed lines) includes the substrate 107 including the display information optical path 109 to receive the display information 103 and including the non-display information optical path 111 to receive the non-display information 105. The display information optical path 109 includes the display information path optical power 113.

The non-display information optical path 111 includes the one more controllable optical materials 203 and the non-display information path optical power 117. In some embodiments, the display information optical path 109 includes the display path bandpass filter 157. In some embodiments, the display information optical path 109 includes the display path polarizing filter 159.

The one or more material activation signals 227 provide control information to the one or more controllable optical materials 203. In some embodiments, the one or more material activation signals 227 provide control information to the photochromic material 223. An optical signal is an exemplary signal suitable for use in providing control information to the photochromic material 223. In some embodiments, the one or more material activation signals 227 provide control information to the electrochromic material 225. A radio frequency signal is an exemplary signal suitable for use in providing control information to the electrochromic material 225. In some embodiments, the one or more material activation signals 227 are provided by the display 143.

In operation, one or more of the photochromic material 223 and the electrochromic material 225 are included in the non-display information optical path 111 to block or transmit information in the non-display information optical path 111. When at least one of the one or more of the photochromic material 223 and the electrochromic material 225 is set to block information in the non-display information optical path 111, substantially only display information 103 in the display information optical path 109 passes through the substrate 107.

Figure 3:
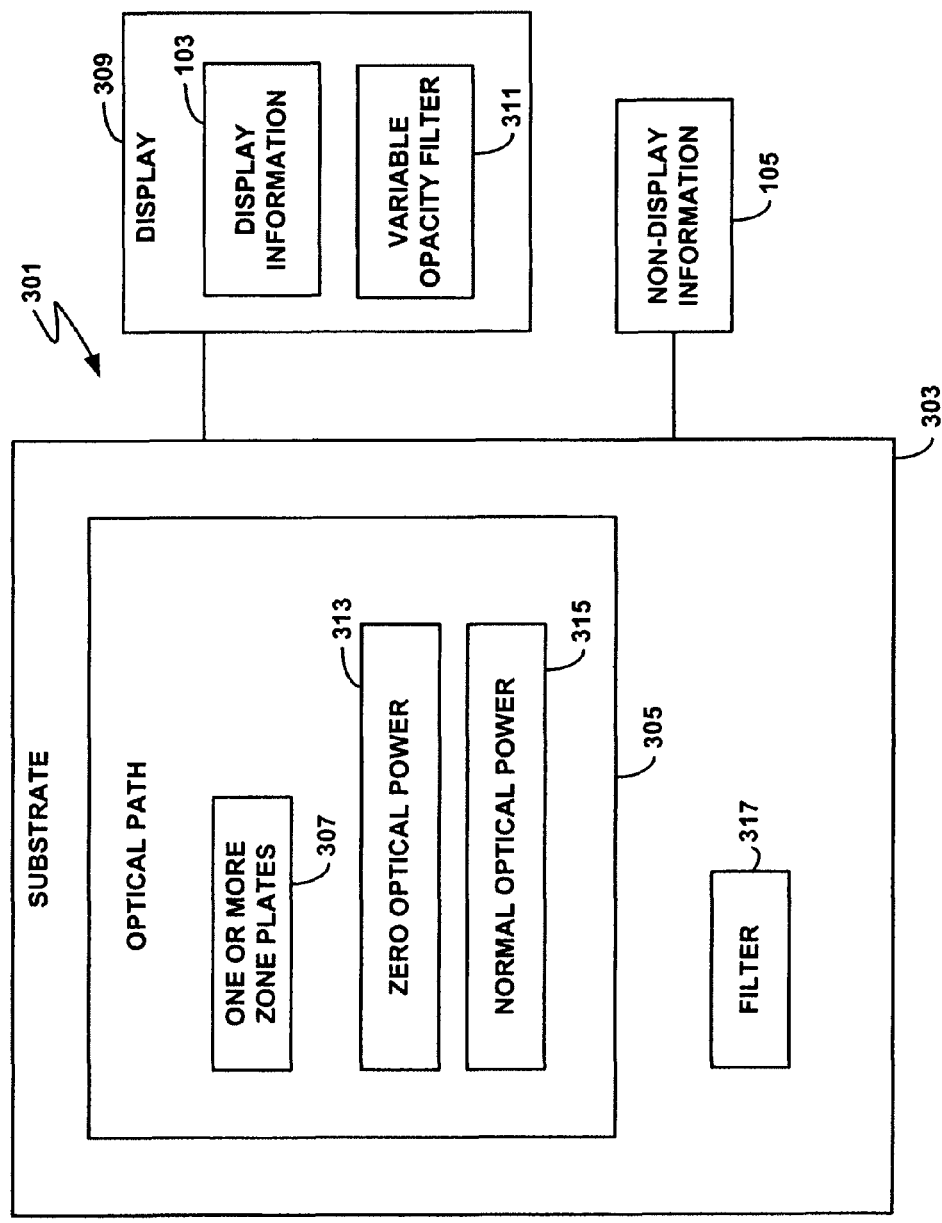
FIG. 3 is an example apparatus including a substrate including an optical path having one or more zone plates to receive display information and non-display information in accordance with some embodiments of the present invention.

FIG. 3 shows an apparatus 301 comprising a substrate 303 including an optical path 305 having one or more zone plates 307 to receive the display information 103 and the non-display information 105 in accordance with some embodiments.

The substrate 303 is not limited to being formed from a particular material or combination of materials. Any materials suitable for use in forming optical components, such as lenses, may be used in forming the substrate 303. Exemplary materials suitable for use in forming the substrate 303 include gels such as silicone hydrogels, glasses, plastics, and polymers such as polymethyl, methacrylate and polymacon. The substrate 303 is not limited to a particular type of optical component. In some embodiments, the substrate 303 includes a lens, such as a contact lens, formed from one or more of the exemplary materials.

The formation of the one or more zone plates 307 is not limited to a particular process or set of processes. In some embodiments, each of the one or more zone plates 307 is formed by patterning an interference filter, such as a rugate filter, in concentric rings in one of the one or more zone plates 307. The patterning of a rugate filter is not limited to a particular type of patterning. In some embodiments, the patterning includes binary patterning. In other embodiments, the patterning includes sinusoidal patterning. The refractive index of the rugate filter may vary continuously and periodically.

The one or more zone plates 307, in some embodiments, include three zone plates stacked substantially one on top of the other in the optical path 305 included in the substrate 303. In some embodiments, a display that provides the display information 103 includes the primary colors red, green, and blue and the one or more zone plates 307 are selected to filter the primary colors. To filter the colors red, green, and blue, one of the one or more zone plates 307 may include a rugate filter formed to filter the color red. A second of the one or more zone plates 307 may include a rugate filter formed to filter the color green, while a third of the one or more zone plates 307 may include a rugate filter formed to filter the color blue. The rugate filter formed to filter the color red includes rings that block red and rings that pass all other colors. The rugate filter formed to filter the color green includes rings that block green and rings that pass all other colors, whereas the rugate filter formed to filter the color blue includes rings that block blue and rings that pass all other colors.

In some embodiments, the display information 103 is substantially collimated by the one or more zone plates 307. To collimate the display information 103, the one or more zone plates 307 are formed to have a focal length of between about five and about two hundred millimeters.

In operation, the apparatus 301 processes the display information 103 and the non-display information 105 substantially simultaneously. The display information 103 is diffracted and substantially focused as the display information 103 passes through the optical path 305. The non-display information 105 passes through the optical path 305 substantially unchanged. The display information 103 and the non-display information 105 are focused to substantially the same focal point at substantially the same time. For a focal point located at a retina of a human visual system, the brain superimposes the two images.

The apparatus 301, in some embodiments, includes a display 309. In some embodiments, the display 309 provides display information 103 including display electromagnetic radiation having at least one characteristic feature. The non-display information 105 includes non-display electromagnetic radiation lacking the at least one characteristic feature. In some embodiments, the display 309 provides the display information 103 including display electromagnetic radiation having a narrow spectral bandwidth. The non-display information 105 includes non-display electromagnetic radiation having a broad spectral bandwidth. In some embodiments, the display 309 provides the display information 103 including display electromagnetic radiation having a display information polarization. The non-display information 105 includes non-display electromagnetic radiation having a non-display information polarization different from the display information polarization.

The optical path 305 is not limited to a particular optical power. In some embodiments, the optical path 305 provides substantially zero optical power 313 for the non-display information 103. In some embodiments, the optical path 305 provides a normal optical power 315 for the non-display information 105.

In some embodiments, the apparatus 301 includes a filter 317 substantially surrounding around the optical path 305. In some embodiments, when the apparatus 301 is used in combination with a human visual system, the filter 317 includes a substantially opaque filter to substantially block the display information 103 outside the optical path 305 from entering the human visual system. In some embodiments, when the apparatus 301 is used in combination with a human visual system, the filter 317 includes a non-display path polarizing filter to substantially block the display information 103 outside the optical path 305 from entering the human visual system. In some embodiments, when the apparatus 301 is used in combination with a human visual system, the filter 317 includes a notch filter to substantially block the display information 103 outside the optical path 305 from entering the human visual system.

Figure 4:
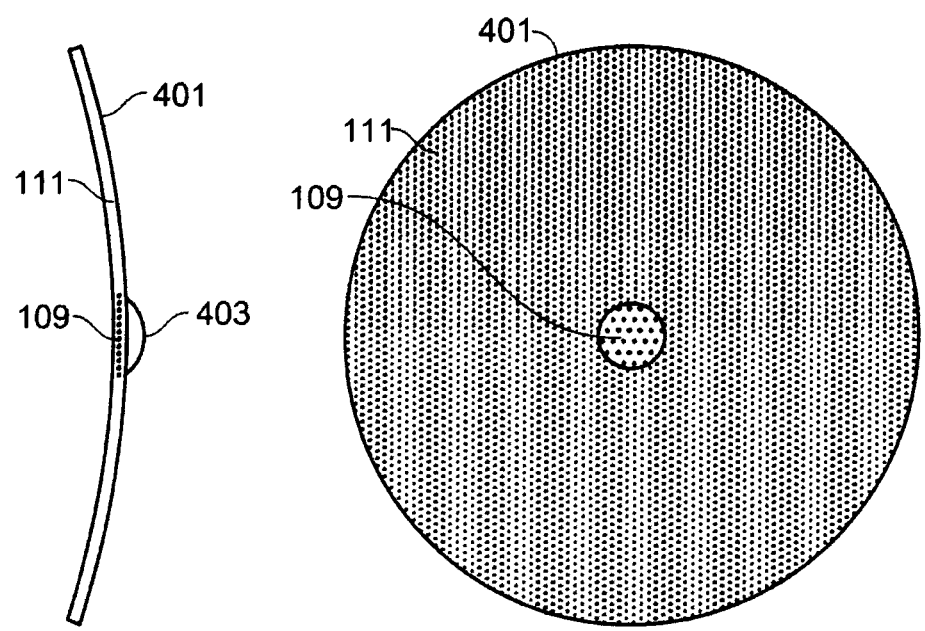
FIGS. 4A and 4B (diametrical section of contact lens shown in 4A) are illustrations of an example contact lens including the display information optical path and the non-display information optical path in accordance with some embodiments of the present invention.

FIGS. 4A and 4B (diametrical section of contact lens 401 shown in 4A) show illustrations of a contact lens 401 including the display information optical path 109 and the non-display information optical path 111 in accordance with some embodiments. The display information optical path 109 forms a substantially cylindrical path through a central area of the contact lens 401. The diameter of the display information optical path 109 may be sized to increase the depth of focus and thereby assist in focusing light from a display, such as a head-mounted display, to a retina in a wearer's visual system. In some embodiments, the display information optical path 109 includes a focusing element 403, such as a lens, to assist the wearer's visual system in focusing light rays to the retina. In some embodiments, the display information optical path 109 includes a wavelength selective filter, a polarization selective filter, or a variable opacity filter including one or more controllable optical materials such as electrochromic or photochromic materials.

The non-display information optical path 111 forms a substantially annular ring surrounding the display information optical path 109. The non-display information optical path 111 may also include a non-display information path optical power to assist the wearer's visual system in focusing light rays from objects located at a greater distance from the wearer's visual system than the display. The non-display information path optical power assists the wearer's visual system by providing an appropriate power to correct for deficiencies in the wearer's visual system. For example, for a nearsighted wearer, the non-display information optical path 111 may include an optical power to correct for the wearer's nearsightedness and permit the nearsighted wearer to clearly view objects more distant from the wearer's visual system than the display. In some embodiments, the non-display information optical path 111 includes (i) a wavelength selective filter (including a wavelength selectivity different from the selectivity of the wavelength selective filter of the display information optical path 109), (ii) a polarization selective filter (including a polarization selectivity different from the polarization selectivity of the polarization selective filter of the display information optical path 109), or (iii) a variable opacity filter.

In operation, the contact lens 401 substantially conforms to the shape of a wearer's cornea. The display information optical path 109 receives and passes or transmits light rays from the display to the wearer. The non-display information optical path 111 receives and passes or transmits light rays from objects more distant from the wearer's visual system than the display.

Figure 5:
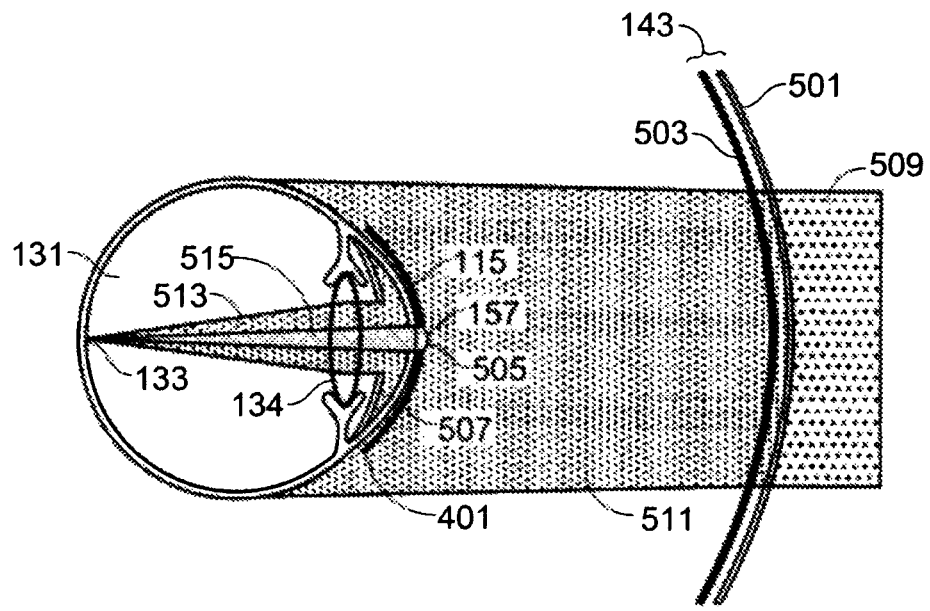
FIG. 5 is an illustration of an example display optically coupled by the contact lens to the human visual system to illustrate processing non-display information using wavelength filters in accordance with some embodiments of the present invention.

FIG. 5 shows an illustration of the display 143 optically coupled by the contact lens 401 to the human visual system 131 to illustrate processing non-display information using wavelength filters in accordance with some embodiments. In the illustrated embodiment, the display 143 includes a display notch filter 501 and an organic light emitting diode display 503. In some embodiments, the contact lens 401 includes (i) display path bandpass filter 157, such as a narrow band bandpass filter, (ii) focusing element 505 to provide display information path optical power, and (iii) one or more filters 115, such as one or more notch filters. The human visual system 131 includes an iris 507, the human lens 134, and the retina 133.

In operation, the light rays 509 received from objects more distant from the contact lens 401 than the display 143 encounter the display 143, the contact lens 401, and the human visual system 131. At the display 143, the display notch filter 501 filters the light rays 509. The wavelengths of the light rays 509 that correspond to the wavelength notches of display notch filter 501 are substantially removed by the display notch filter 501, allowing light rays 511 to pass. The light rays 511 pass through the display 143 substantially unaltered. At the contact lens 401, the light rays 511 are substantially blocked by the display path bandpass filter 157 and substantially passed by the one or more filters 115. At the human visual system 131, one or more of the light rays 511 pass through the iris 507 to form light rays 513. The human lens 134 focuses the light rays 513 to the retina 133.

Shadow 515 is created by the light rays blocked by the display path bandpass filter 157. The display path bandpass filter 157 slightly reduces the image intensity at the retina 133 when compared to an image formed at the retina 133 in the absence of the display path bandpass filter 157. Otherwise, the image at the retina 133 is substantially unaltered by the display path bandpass filter 157. The focusing element 505 has substantially no affect on the light rays 513 reaching the retina 133, as the light rays 511 received at the focusing element 505 are blocked by the display path bandpass filter 157.

In the absence of the display 143, a wearer of the contact lens 401 sees a normal; real world environment except that the light rays 511 now include the wavelengths substantially blocked by the display notch filter 501 when the display 143 is in use. At the contact lens 401, the wavelengths blocked at the display notch filter 501 when the display 143 is in use are passed by the display path bandpass filter 157 and defocused by the focusing element 505.

Figure 6:
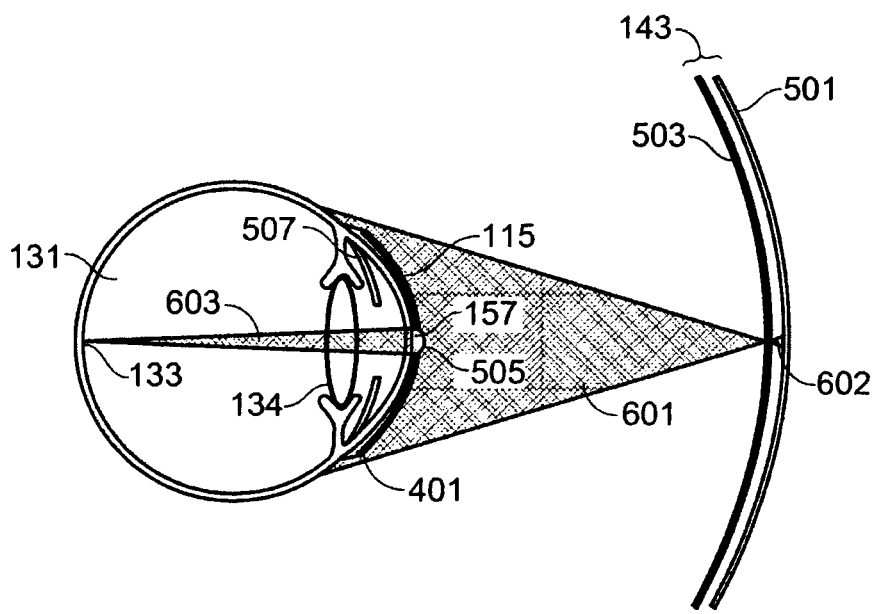
FIG. 6 is an illustration of an example display optically coupled by the contact lens to the human visual system to illustrate processing display information using wavelength filters in accordance with some embodiments of the present invention.

FIG. 6 shows an illustration of the display 143 optically coupled by the contact lens 401 to the human visual system 131 to illustrate processing display information using wavelength filters in accordance with some embodiments. The display 143 includes the display notch filter 501 and the organic light emitting diode display 503. The contact lens 401 includes (i) the display path bandpass filter 157, such as a narrow bandwidth bandpass filter, (ii) the focusing element 505 to provide display information path optical power, and (iii) the one or more filters 115. The human visual system 131 includes the iris 507, the human lens 134, and the retina 133.

In operation, light rays 601 and 602 are provided by the organic light emitting diode display 503. The light rays 602 are blocked by the display notch filter 501. Thus, the light rays 602 are not visible to a viewer looking at a wearer of the contact lens 401. The light rays 601 are received at the contact lens 401 and the human visual system 131. The light rays 601 are blocked by the one or more filters 115, for example, a notch filter, but are passed as light rays 603 by the display path bandpass filter 157. The focusing element 505, such as a focusing lens, provides optical power to assist the human lens 134 to focus the light rays 603 to the retina 133. The light rays 603 are substantially unaffected by the iris 507.

In some embodiments, the display 143 is occluded or partially occluded. In such embodiments, a material having an opacity is included in the display 143 to provide the occlusion or partial occlusion. When the material is included in the display 143 on the side of display 143 facing away from the contact lens 401, some or all of the non-display information or ambient light rays are blocked. In such embodiments, the display notch filter 501 is not required.

Figure 7:
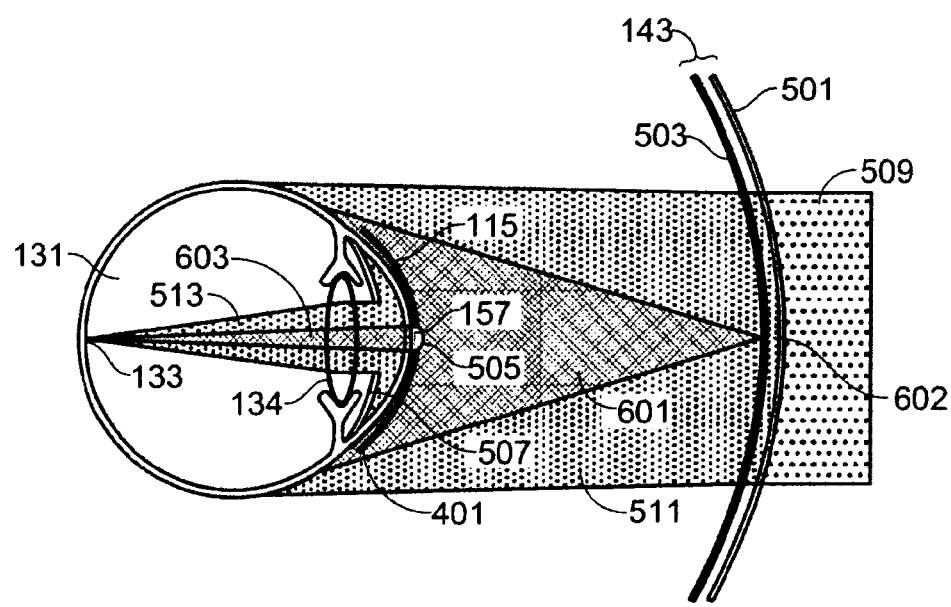
FIG. 7 is an illustration of an example display optically coupled by the contact lens to the human visual system to illustrate processing to combine non-display information and display information using wavelength filters in accordance with some embodiments of the present invention.

FIG. 7 shows an illustration of the display 143 optically coupled by the contact lens 401 to the human visual system 131 to illustrate processing to combine non-display information and display information using wavelength filters in accordance with some embodiments. The display 143 includes the display notch filter 501 and the organic light emitting diode display 503. The contact lens 401 includes the display path bandpass filter 157, the focusing element 505 to provide display information path optical power, and the one or more filters 115. The human visual system 131 includes the iris 507, the human lens 134, and the retina 133.

In operation, the light rays 509 received from objects more distant from the contact lens 401 than the display 143 are processed as described above in the description of FIG. 5 to provide light rays 511 and 513. The light rays 601 and 602 provided by the display 143 are processed as described above in the description of FIG. 6 to provide light rays 603. The light rays 603 come to a focus at substantially the same spot on the retina 133 as the light rays 513. The wearer's brain combines the retinal images provided by the light rays 603 and the light rays 509 to form a superimposed image.

Figure 8:
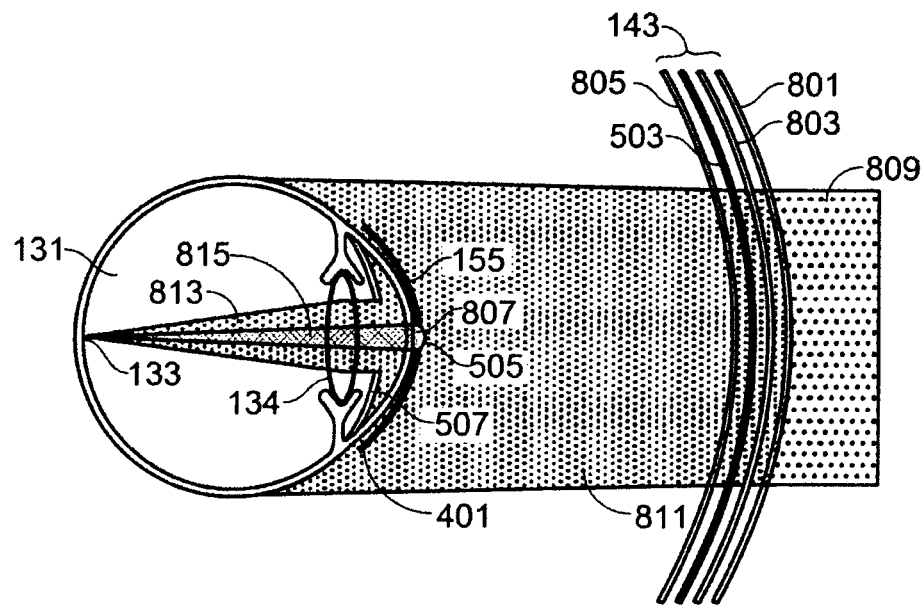
FIG. 8 is an illustration of an example display optically coupled by the contact lens to the human visual system to illustrate processing non-display information using polarizing filters in accordance with some embodiments of the present invention.

FIG. 8 shows an illustration of the display 143 optically coupled by the contact lens 401 to the human visual system 131 to illustrate processing non-display information using polarizing filters in accordance with some embodiments. The display 143 includes the organic light emitting diode display 503, a display polarizing filter 801, and display shutters 803 and 805. The contact lens 401 includes a display path filter 807, such as a display path bandpass filter or a display path polarizing filter, the focusing element 505 to provide display information path optical power, and the non-display path polarizing filter 155. The human visual system 131 includes the iris 507, the human lens 134, and the retina 133.

In operation, the light rays 809 are polarized by the display polarizing filter 801 to form light rays 811. The shutters 803 and 805 are switched to the same polarization as the display polarizing filter 801. Thus, the light rays 811 pass through the shutters 803 and 805 substantially unaltered. The organic light emitting diode display 503 is set to an "off" state and is therefore substantially translucent to the light rays 811. Thus, the light rays 811 also pass through the organic light emitting diode display 503 substantially unaltered. The light rays 811 are substantially blocked by the display path filter 807. In some embodiments, the display path filter 807 includes the display path bandpass filter 157 (shown in FIG. 1D). In some embodiments, the display path filter 807 includes the display path polarizing filter 159 (shown in FIG. 1D) having a polarization different from the polarization of the shutters 803 and 805. The non-display path polarizing filter 155 has the same polarization as the shutters 803 and 805. Thus, the light rays 811 pass through the non-display path polarizing filter 155 substantially unaltered. At the human visual system 131, the iris 507 limits the light rays passing through the iris 507 to light rays 813. The human lens 134 focuses the light rays 813 at the retina 133.

Shadow 815 is created by the light rays blocked by the display path filter 807. The display path filter 807 slightly reduces the image intensity at the retina 133 when compared to an image formed at the retina 133 in the absence of the display path filter 807. Otherwise, the image at the retina 133 is substantially unaltered by the display path filter 807. The focusing element 505 has substantially no affect on the light rays 811 reaching the retina 133, as the light rays 811 passing through the focusing element 505 are substantially blocked by the display path filter 807.

In the absence of the display 143, a wearer of the contact lens 401 sees a normal, real world environment except that the light rays 811 are polarized. For the display path filter 807 including either a polarizing filter or a bandpass filter, the light rays passing through the display path filter 807 are defocused by the focusing element 505 before reaching retina 133.

Figure 9:
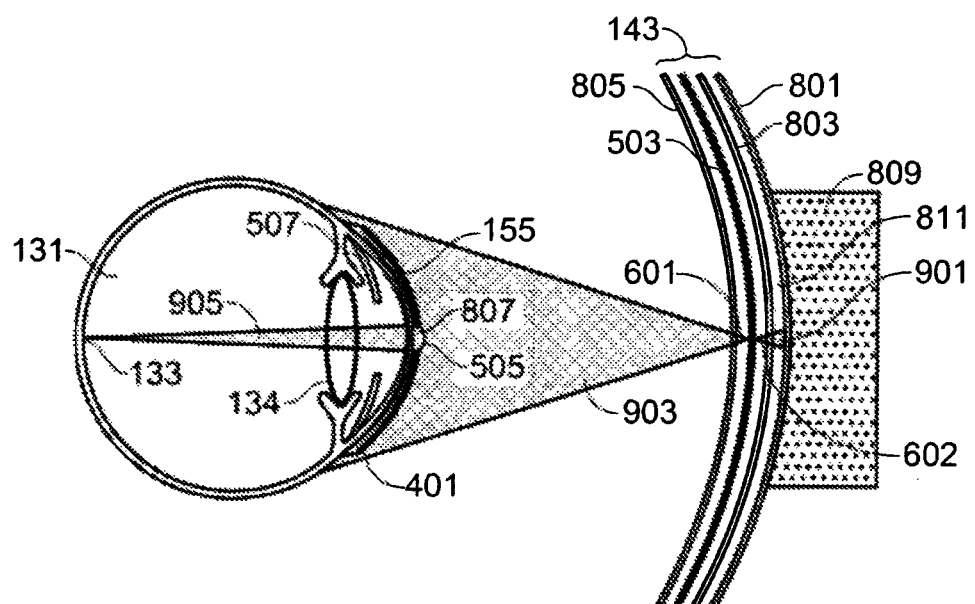
FIG. 9 is an illustration of an example display optically coupled by the contact lens to the human visual system to illustrate processing display information using polarizing filters in accordance with some embodiments of the present invention.

FIG. 9 shows an illustration of the display 143 optically coupled by the contact lens 401 to the human visual system 131 to illustrate processing display information using polarizing filters in accordance with some embodiments. The display 143 includes the display polarizing filter 801, the display shutter 803, the organic light emitting diode display 503, and the display shutter 805. The contact lens 401 includes the non-display path polarizing filter 155, the display path filter 807, such as a display path bandpass filter or a display path polarizing filter, and the focusing element 505 to provide display information path optical power. The human visual system 131 includes the iris 507, the human lens 134, and the retina. 133.

In operation, the display polarizing filter 801 polarizes the light rays 809 to form light rays 811. The shutter 803 is switched to a polarization to substantially block the light rays 811, and the organic light emitting diode display 503 is set to an "on" state. The organic light emitting diode display 503 provides the light rays 601 and 602, while the shutter 803 polarizes the light rays 602 to form light rays 901. The display polarizing filter 801 is set to a polarization to substantially block the light rays 901. Thus, the light rays 901 are not visible to a viewer looking at a wearer of the display 143. The shutter 805 polarizes the light rays 601 to form light rays 903. The non-display path polarizing filter 155 is set to a polarization to substantially block the light rays 903. For the display path filter 807 set to substantially the same polarization as the shutter 805, the display path filter 807 passes the light rays 903 substantially unaltered. The focusing element 505, such as a focusing lens, provides optical power to assist the human lens 134 to focus the light rays 905 to the retina 133. Thus, the focusing element 505 may provide an optical power to assist the human lens 134 in focusing the light rays 903 at the retina 133. The human lens 134 in combination with the focusing element 505 processes the light rays 903 to form light rays 905. The iris 507 has substantially no affect on the light rays 905 substantially focused at the retina 133.

If the display 143 is occluded or partially occluded, the display polarization filter 801 is not required. Instead, in some embodiments, a material having an opacity is included on the side of the display 143 facing away from the contact lens 401 to block some or all of the light rays 509 including the non-display information.

In some embodiments, a quarter wave-plate is included in the shutter 805 to convert the light rays 601 having a linear polarization to a circular polarization. To support the processing of circularly polarized radiation, the non-display path polarizing filter 155 includes a filter to provide transmission of right-handed circularly polarized radiation. Also, to support the processing of circularly polarized radiation, the display path filter 807 includes a filter to provide transmission of left-handed circularly polarized radiation. In operation, to process the non-display information, the shutter 805 including the quarter wave-plate is set to pass right-handed circularly polarized radiation. In operation, to process the display information the shutter 805 including the quarter wave plate is set to pass left-handed circularly polarized radiation. In some embodiments, the display path filter 807 includes a display path bandpass filter.

A filter providing transmission of circularly polarized radiation, unlike a filter providing for transmission of linearly polarized radiation, does not require rotational alignment of the contact lens 401 with the human visual system 131. However, the non-display path polarizing filter 155 is not limited to a filter for processing circularly polarized radiation. In some embodiments, the non-display path polarizing filter 155 includes a filter to provide transmission of linearly polarized radiation.

Referring to FIG. 8 and FIG. 9, in some embodiments the shutters 803 and 805 are switched between one polarization state and another polarization state in synchronization with the setting of the organic light emitting diode display 503 to an "on"state and an "off" state. For example, when the organic light emitting diode display 503 is set to an "on" state, the shutters 803 and 805 are switched to the state as described for FIG. 9 to process the display information provided by the light rays 601 and 602 from the organic light emitting diode display 503. And, for example, when the organic light emitting diode display 503 is set to an "off" state, the shutters 803 and 805 are switched to the state as described for FIG. 8 to process non-display information provided by the light rays 809. The switching rate is set to a frequency that allows the brain of a wearer of the contact lens 401 to form a single image from the superposition of the images of the display information and the non-display information.

Polarizing shutters, such as shutters 803 and 805, can utilize liquid crystal display panels that re-orient their liquid crystals in response to an applied electric field. When the crystals are oriented in one direction, they pass electromagnetic radiation having a particular polarization. Changing the electric field to orient the crystals in a second direction causes electromagnetic radiation having a second polarization to be passed.

Figures 10A, 10B:
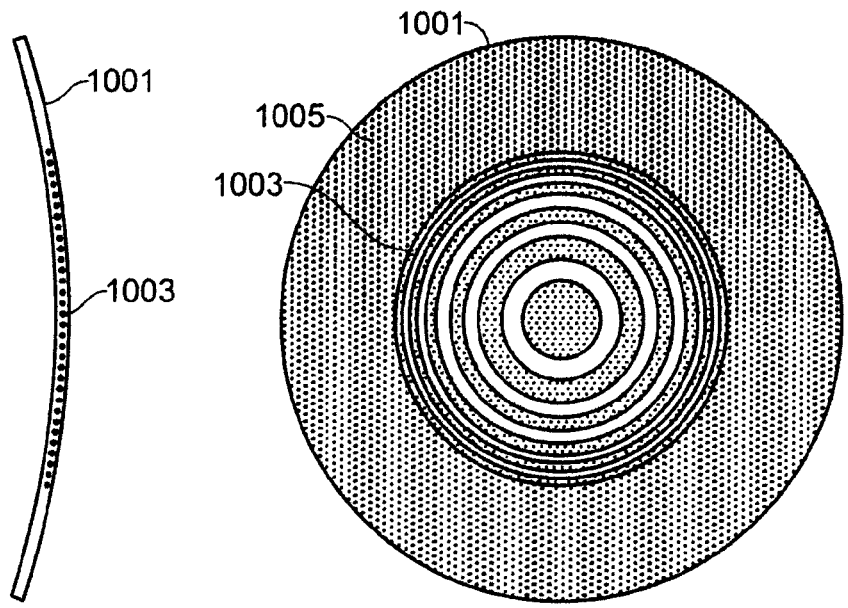
FIGS. 10A and 10B (diametrical section of illustration shown in 10A) are illustrations of an example contact lens including one or more zone plate filters in accordance with some embodiments of the present invention.

FIGS. 10A and 10B (diametrical section of illustration shown in IOA) show illustrations of a contact lens 1001 including one or more zone plate filters 1003 in accordance with some embodiments. In certain embodiments, the one or more zone plate filters 1003 are formed by patterning a rugate filter in concentric rings of a diffraction zone plate, which focuses light using diffraction to cause constructive interference at a focal point to create an image. A rugate filter includes optical interference films of varying thickness. The refractive index of the optical interference film varies as a function of the film's optical thickness. The use of a rugate filter in forming a zone plate results in a zone plate that operates on a particular set of wavelengths, for example, a narrow band of wavelengths. In some embodiments, the patterning of the zone plate is binary. Binary patterning includes substantially opaque and transparent rings of substantially equal areas. In some embodiments, the patterning is sinusoid. Sinusoid patterning includes rings having substantially gradual variations in opacity. In some embodiments, the contact lens 1001 includes a notch filter 1005 forming substantially an annular ring around the one or more zone plate filters 1003.

Figure 11:
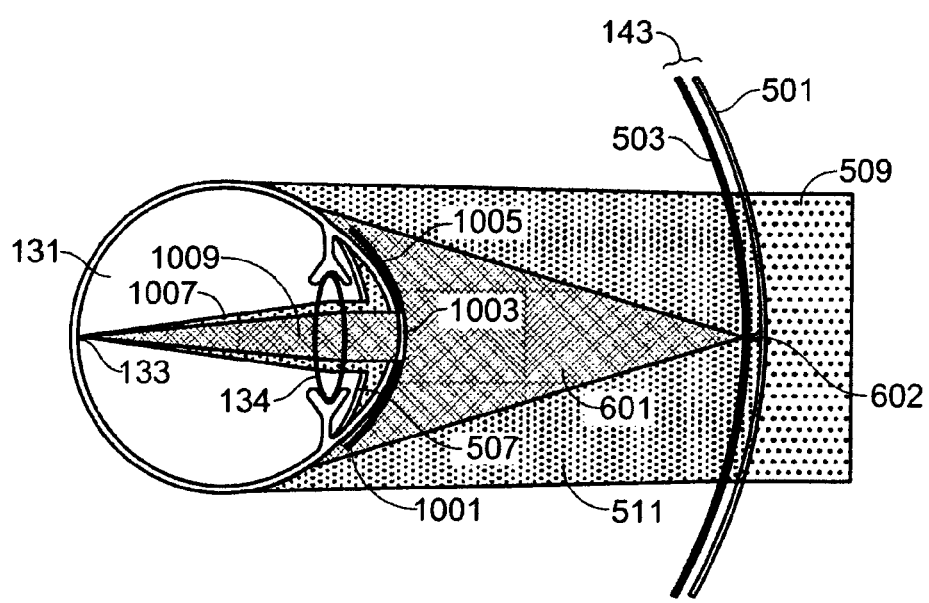
FIG. 11 is an illustration of an example display optically coupled by the contact lens to the human visual system to illustrate processing display information and non-display information using the one or more zone plate filters in accordance with some embodiments of the present invention.

FIG. 11 shows an illustration of the display 143 optically coupled by the contact lens 1001 to the human visual system 131 to illustrate processing display information and non-display information using the one or more zone plate filters 1003 in accordance with some embodiments. The display 143 includes the display notch filter 501 and the organic light emitting diode display 503. The contact lens 1001 includes the one or more zone plate filters 1003. In some embodiments, the contact lens 1001 includes the notch filter 1005. The human visual system 131 includes the iris 507, the human lens 134, and the retina 133.

In operation, the light rays 509 providing non-display information received from objects more distant from the contact lens 1001 than the display 143 encounter the display 143, the contact lens 1001, and the human visual system 131. At the display 143, the display notch filter 501 filters the light rays 509. The wavelengths of the light rays 509 that correspond to the wavelength notches of the display notch filter 501 are substantially removed by the display notch filter 501, passing the light rays 511. The light rays 511 pass through the display 143 substantially unaltered. At the contact lens 1001, the light rays 511 pass through the one or more zone plate filters 1003 and the notch filter 1005 substantially unaltered. At the human visual system 131, the iris 507 may block some of the light rays 511, passing light rays 1007. The human lens 134 focuses the light rays 1007 including the non-display information at the retina 133.

In operation, the organic light emitting diode display 503 provides light rays 601 and 602. The light rays 602 are directed away from the contact lens 1001 and are substantially blocked by the display notch filter 501. Thus, the light rays 602 are not visible to a viewer looking at a wearer of the display 143. The light rays 601 are directed toward the contact lens 1001 including the notch filter 1005 and the one or more zone plate filters 1003. At the notch filter 1005, the light rays 601 are substantially blocked. At the one or more zone plate filters 1003, the light rays 601 are diffracted to form the light rays 1009. The human lens 134 focuses the light rays 1009 including the display information at the retina 133.

In operation, the light rays 509 received from objects more distant from the contact lens 1001 than the display 143 are processed as described above to provide the light rays 1007 including the non-display information to the retina 133. The light rays 601 provided by the display 143 are processed as described above to provide the light rays 1009 including the display information to the retina 133. The light rays 1007 and the light rays 1009 are focused at substantially the same spot at the retina 133 at substantially the same time. Thus, the brain of the wearer of the contact lens 1001 combines the retinal image provided by the light rays 1007 including the non-display information and the retinal image provided by the light rays 1009 including the display information to form a superimposed image including the display information and the non-display information.

In the absence of the display 143, a wearer of the contact lens 1001 sees a normal, real world environment except the light rays 511 now include the wavelengths substantially blocked by the display notch filter 501. At the contact lens 1001, the wavelengths blocked at the display notch filter 501 when the display 143 is present are diffracted by the one or more zone plate filters 1003 and defocused by the human lens 134.

If the display 143 is occluded or partially occluded, the display notch filter 501 is not required. Instead, in some embodiments, a material having an opacity is included on the side of the display 143 facing away from the contact lens 1001 to block some or all of the light rays 509 including the non-display information.

Figure 12:
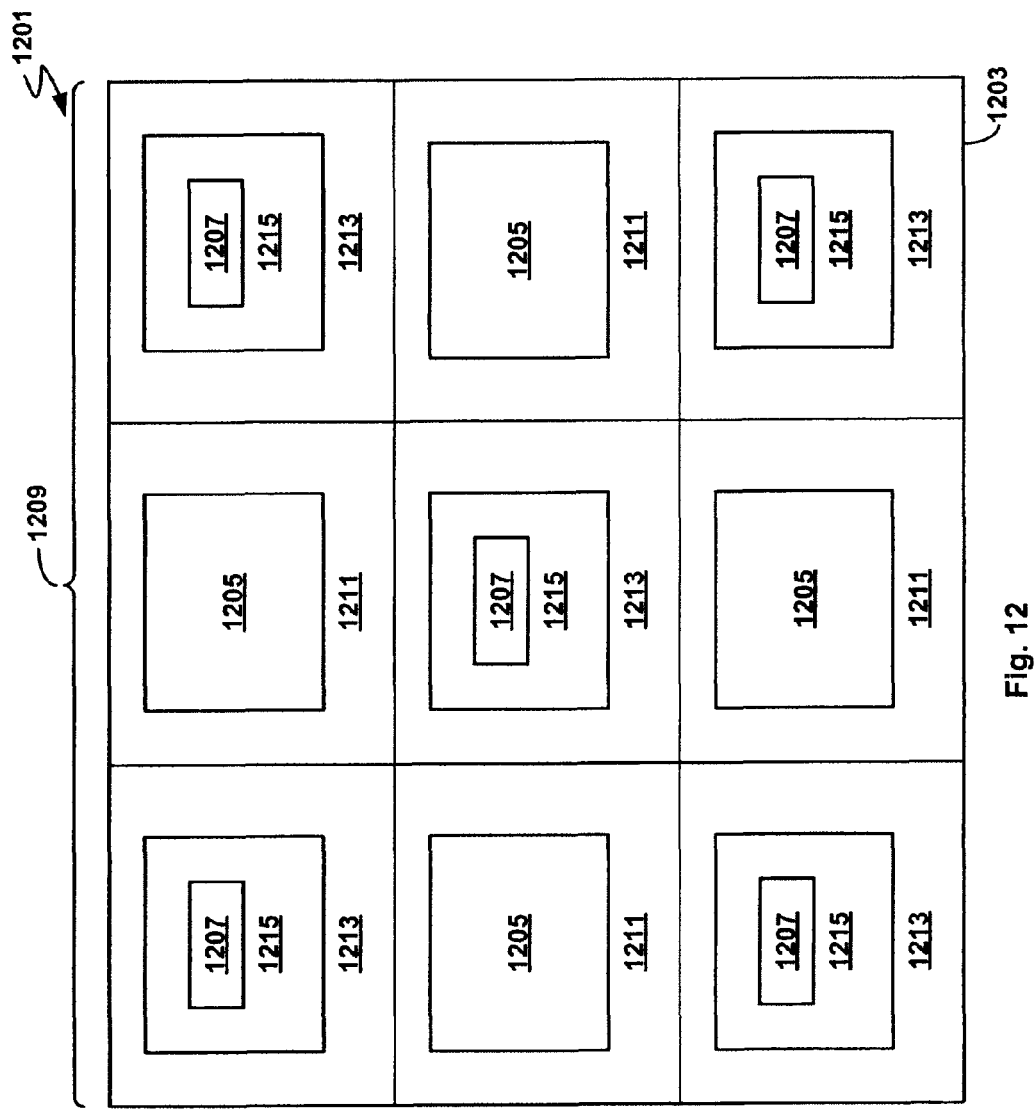
FIG. 12 is an illustration of an example apparatus including a substrate, a substantially transparent pixel unit, and an organic light emitting diode unit in accordance with some embodiments of the present invention.

FIG. 12 shows an illustration of an apparatus 1201 including a substrate 1203, a substantially transparent pixel unit 1205, and an organic light emitting diode unit 1207 in accordance with some embodiments. The substrate 1203 includes a pattern 1209 of pixel sites including a first pattern of one or more first pixel sites 1211 and a second pattern of one or more second pixel sites 1213. The substantially transparent pixel unit 1205 is located at substantially each of the one or more first pixel sites 1211. The organic light emitting diode pixel unit 1207 including a filter 1215 is located at substantially each of the one or more second pixel sites 1213. The filter 1215 is located on the substrate 1203 to enable filtering of the electromagnetic radiation emitted by the organic light emitting diode unit before the electromagnetic radiation reaches a viewer. To filter the electromagnetic radiation, such as visible light, emitted by the organic light emitting diode pixel unit 1207, the area of the filter 1215 is substantially equal to or greater than the area of the organic light emitting diode pixel unit 1207. In some embodiments, the filter 1215 is a narrow band filter. In other embodiments, the filter 1215 is a polarizing filter. The pattern 1209 of pixel sites is not limited to a particular pattern. In some embodiments, the pattern 1209 of pixel sites includes a checkerboard pattern including the first pattern of the one or more first pixel sites 1211 alternating with the second pattern of the one or more second pixel sites 1213. The sites are not limited to a particular shape and the shapes shown are only for schematic illustration.

Figure 13:
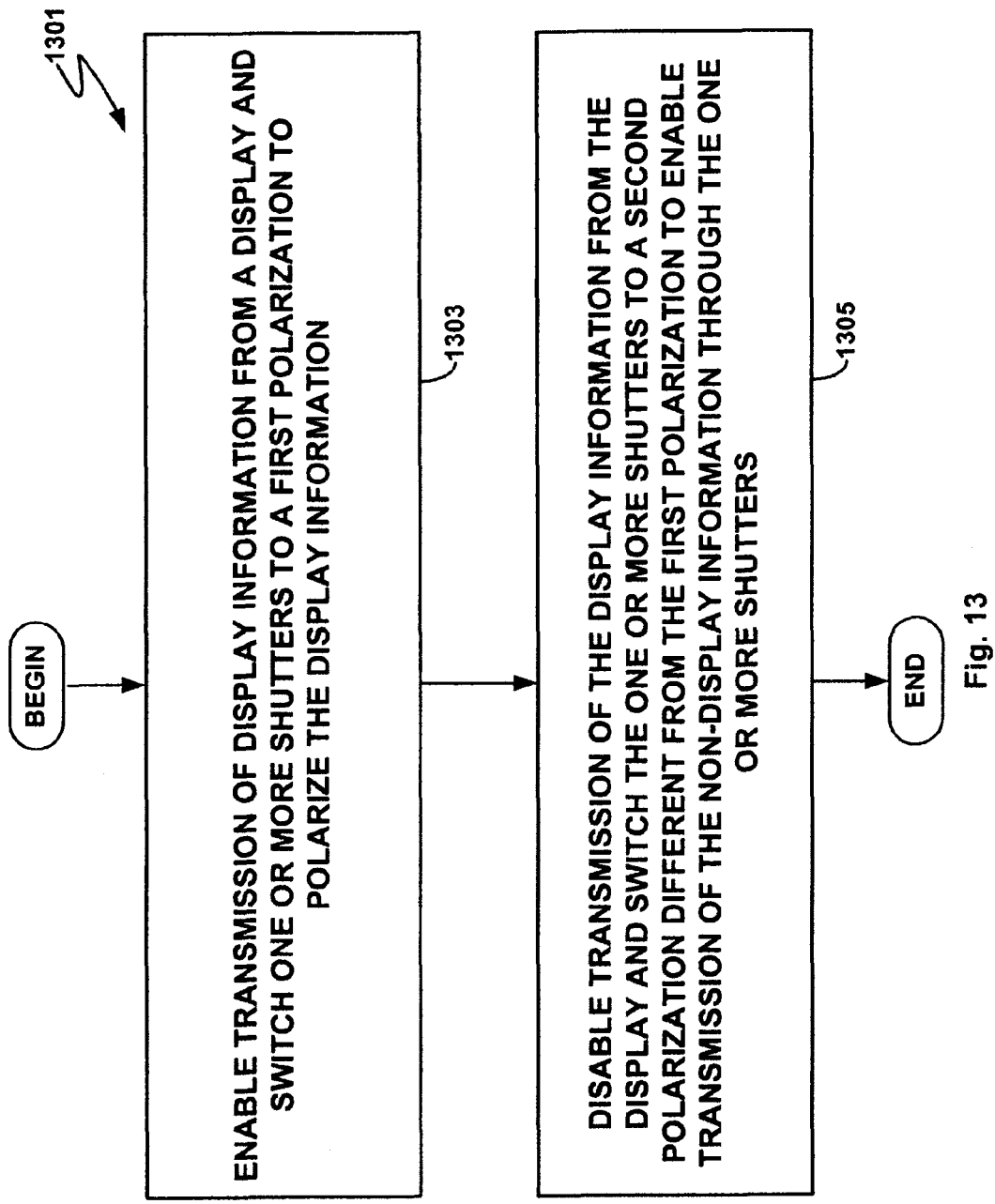
FIG. 13 is a flow diagram of an example method including enabling and disabling transmission of display information and transmission of non-display information in accordance with some embodiments of the present invention.

FIG. 13 shows a flow diagram of a method 1301 including enabling and disabling transmission of display information and transmission of non-display information in accordance with some embodiments. In the illustrated embodiment, the method 1301 enables transmission of display information from a display and switches one or more shutters to a first polarization to polarize the display information (block 1303), and disables transmission of the display information from the display and switches the one or more shutters to a second polarization different from the first polarization to enable transmission of the non-display information through the one or more shutters (block 1305). In some embodiments, the method 1301 includes receiving the display information and the non-display information at a contact lens. In some embodiments, the method 1301 includes substantially blocking the display information at a non-display information optical path included in the contact lens and substantially transmitting the display information at a display information optical path included in the contact lens.

Figure 14:
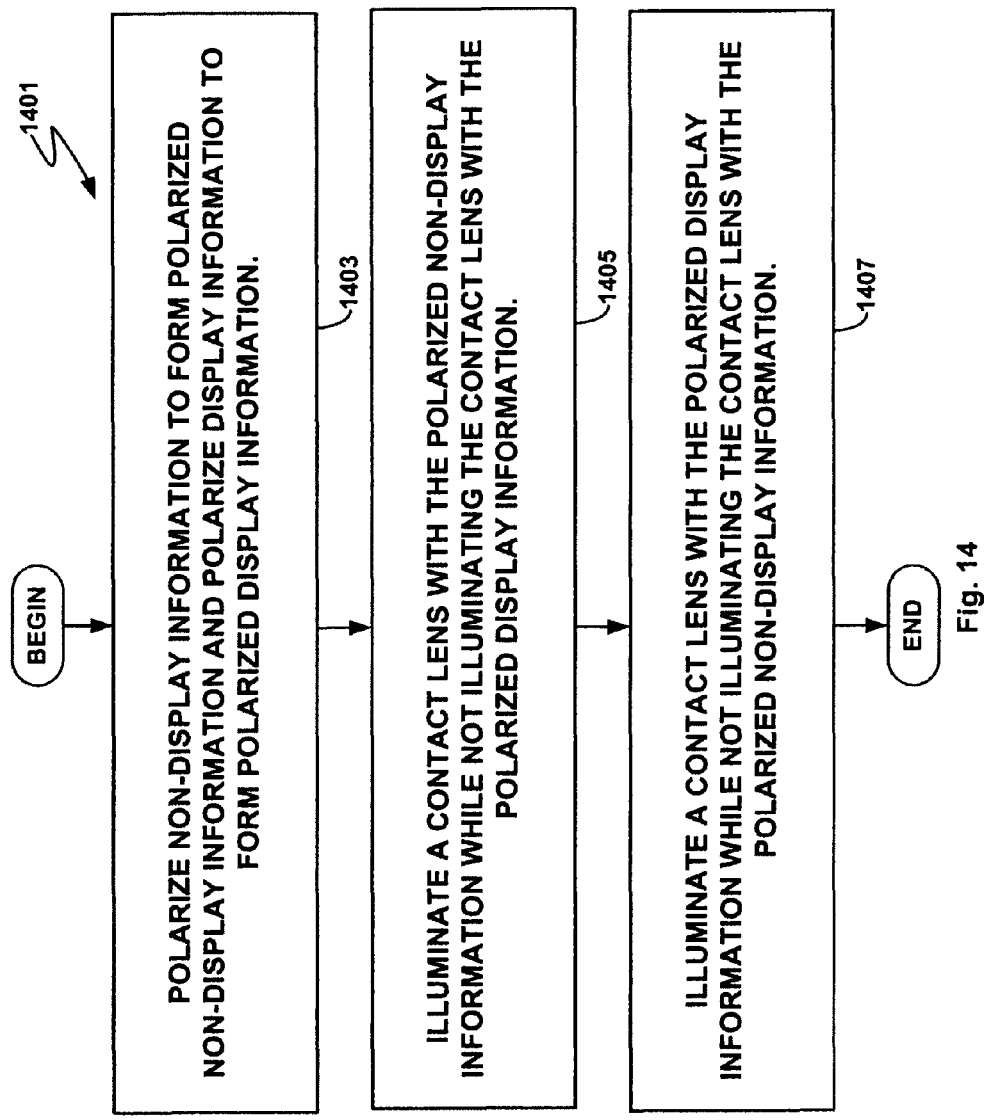
FIG. 14 is a flow diagram of an example method including polarizing display and non-display information and illuminating a contact lens with the polarized display and non-display information in accordance with some embodiments of the present invention.

FIG. 14 shows a flow diagram of a method 1401 including polarizing display and non-display information and illuminating a contact lens with the polarized display and non-display information in accordance with some embodiments. In the illustrated embodiment, the method 1401 (i) polarizes non-display information to form polarized non-display information and polarizes display information to form polarized display information (block 1403), (ii) illuminates a contact lens with the polarized non-display information while not illuminating the contact lens with the polarized display information (block 1405), and (iii) illuminates the contact lens with the polarized display information while not illuminating the contact lens with the polarized non-display information (block 1407). In some embodiments, the method 1401 includes substantially blocking the polarized display information at the non-display information path at the contact lens.

Figure 15:
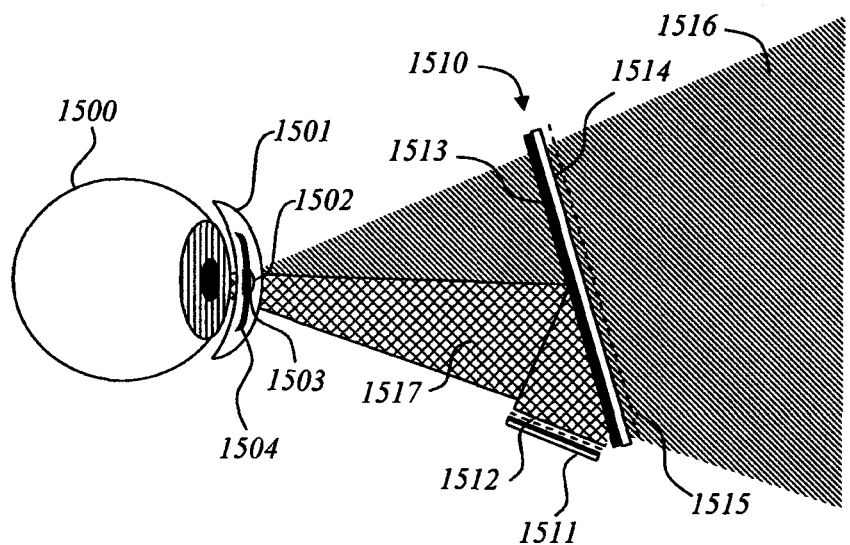
FIG. 15 is an illustration of an example configuration of a contact lens and a display panel reflected off a narrow spectral band beam splitter, in accordance with one embodiment of the present invention.

FIG. 15 shows an example configuration of a contact lens and a display panel reflected off a narrow spectral band beam splitter, in accordance with one embodiment of the present invention. Referring now to FIG. 15, a viewer's eye 1500 is shown wearing a contact lens 1501 for viewing a display panel 1511 reflected off a narrow spectral band beam splitter 1510 while simultaneously viewing the surrounding ambient light 1516 visible through the beam splitter 1510. As illustrated, beam splitter 1510 comprises a transparent substrate 1514 and a Rugate coating 1513 or other means to reflect narrow spectral bands of light.

The light 1517 emitted from the display panel 1511 is reflected off of the narrow band spectral reflection coating 1513 and is redirected towards the eye 1500. This light does not need to be focused prior to illuminating the eye. Because the light is free to radiate out in a broad fashion, it is not restricted to just the cone of light 1517 depicted in FIG. 15.

After being reflected, light 1517 comprises only narrow bands of light. Narrow spectral notch filter 1504 in contact lens 1501 blocks this light from entering the eye except through the aperture in filter 1504. The light that passes through the aperture in filter 1504 also passes through lenslet 1502 and filter 1503, and into the pupil. Lenslet 1502 substantially collimates light 1517 such that the eye's biological lenses can properly focus the image onto the retina.

Light 1516 from the surrounding environment passes through transparent substrate 1514 and through narrow spectral band reflector 1513. The spectral bands of light 1516 that correspond to the spectral reflection bands of filter 1513 are reflected back, but the remaining broad bands of light pass on through unmodified. This broadband light illuminates the eye 1500 and contact lens 1501. In particular, the light is free to pass through the narrow spectral notch filter 1504, where it enters the pupil and is focused normally by the eye 1500 onto the retina. The light that passes through the aperture in filter 1504 is blocked from entering the pupil by filter 1503.

As light 1517 and light 1516 focus onto the retina, the brain processes the two images from the two lights as if it were one image superimposed together. As a result, the viewer is able to see the image from the display together with the image from the surrounding environment.

The light 1517 from display 1511 that is broader in spectral bandwidth than the narrow bands of reflector 1513 passes through reflector 1513 and transparent substrate 1514, thereby becoming visible to an observer. As such, in the illustrated embodiment, narrow bandpass filter 1512 blocks light that is broader in spectral bandwidth than the narrow bands of reflector 1513, thereby blocking spectral bands broad enough to pass through filter 1513 and be visible to an observer.

In other embodiments, light 1517 is prevented from being visible to an observer by using a polarized filter of a first polarization for filter 1512 and polarizer filter 1515 of a second polarization. Polarizer filter 1512 blocks light of the second polarization and passes light of the first polarization. The passed light is free to transmit through filter 1513 and substrate 1514, but is blocked by polarization filter 1515, which blocks light of the first polarization. Light 1516 of the second polarization is free to pass through filter 1515, substrate 1514, and filter 1513.

Figure 16:
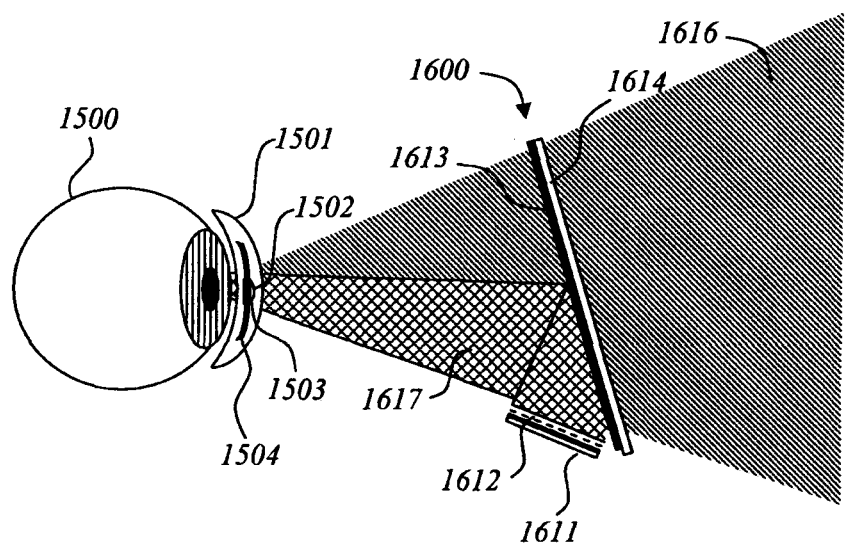
FIG. 16 is an illustration of an example configuration of a contact lens and a display panel reflected off a polarized beam splitter, in accordance with one embodiment of the present invention.

FIG. 16 illustrates an example configuration of a contact lens and a display panel reflected off a polarized beam splitter, in accordance with one embodiment of the present invention. Referring to FIG. 16, a viewer's eye 1510 is shown wearing a contact lens 1501 for viewing a display panel 1611 reflected off a polarized beam splitter 1600 while simultaneously viewing the surrounding ambient light 1616 visible through the beam splitter 1600.

Beam splitter 1600 comprises a transparent substrate 1614 and a polarization reflector 1613. Light of a first polarization is transmitted through reflector 1613 and light of a second polarization is reflected by reflector 1613.

The light 1617 emitted from the display panel 1611 is reflected off reflector 1613 and redirected toward the eye 1500. This light does not need to be focused prior to illuminating the eye. As the light is free to radiate out in a broad fashion, it is not restricted to just the cone of light 1617 depicted in FIG. 16.

After reflection, light 1617 comprises only light having the second polarization. Polarization filter 1504 in contact lens 1501 blocks this light from entering the eye everywhere except through the aperture in filter 1504. The light that passes through the aperture in filter 1504, passes through lenslet 1502 and filter 1503, and eventually enters the pupil. Lenslet 1502 substantially collimates light 1617 such that the eye's biological lenses can properly focus the image onto the retina.

Light 1616 from the surrounding environment of the first polarization passes through transparent substrate 1614 and through polarization reflector 1613; light 1616 of a second polarization is reflected back. Light 1616 of the first polarization illuminates eye 1500 and contact lens 1501. This light is free to pass through the polarization filter 1504, where it enters the pupil and is focused normally by the eye 1500 onto the retina. The light that passes through the aperture in filter 1504 is blocked from entering the pupil by filter 1503.

As light 1617 and light 1616 focus onto the retina, the brain processes the two images from the two lights as if it were one image superimposed together. As a result, the viewer is able to see the image from the display together with the image from the surrounding environment.

The light 1617 from display 1611 that is of the first polarization passes through reflector 1613 and through transparent substrate 1614, thereby becoming visible to an observer. Polarization filter 1612 blocks light of a first polarization such that there is no light passing through filter 1613, thereby preventing light 1617 from being visible to an observer.

Figure 17:
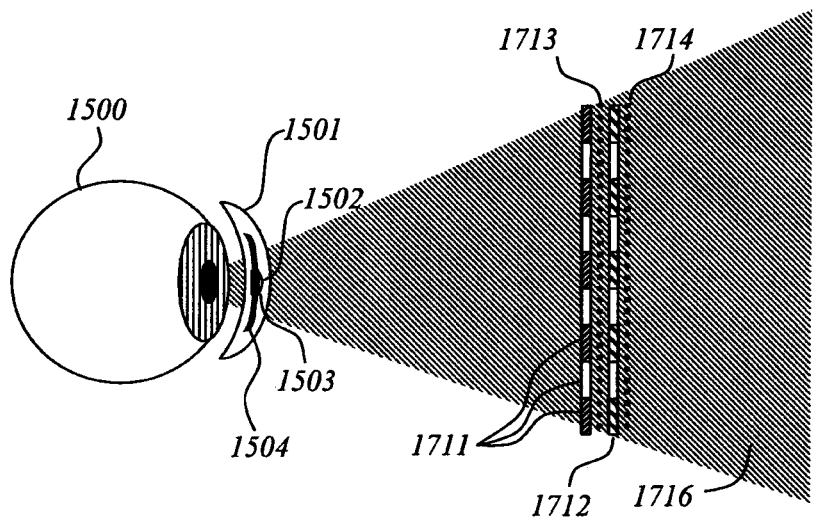
FIG. 17 is an illustration of an example configuration of a contact lens and display pixels in front of an LCD display panel, in accordance with one embodiment of the present invention.

FIG. 17 shows an example configuration of a contact lens and display pixels in front of an LCD display panel, in accordance with one embodiment of the present invention. Referring to FIG. 17, a viewer's eye 1500 is depicted wearing a contact lens 1501 for viewing display pixels 1711 in front of an LCD display panel 1712 while simultaneously viewing the surrounding ambient light 1716 visible through display pixels 1711 and the LCD display panel 1712.

Depending on the embodiment, display pixels 1711 may comprise any suitable pixel construction. Examples of this include electroluminescent pixels, reflected electroluminescent pixels, and pixels reflected from a projector. The filters and lenslet in contact lens 1501 enable the wearer to view pixels 1711 simultaneously with viewing light 1716 from the surrounding environment.

In operation, light 1716 is frequently brighter than pixels 1711, making it difficult for the viewer to see pixels 1711. Accordingly, in the illustrated embodiment, the pixels of LCD display panel 1712 can be adjusted to block some of light 1716 so that pixels 1711 are not overpowered by light 1716.

Light 1716 of a first polarization passes through polarization filter 1714. Each pixel within LCD display 1712 is set to a desired polarization such that polarization filter 1713 blocks or passes the desired amount of light for each pixel. In this way, each pixel 1711 can have the amount of light 1716 passing through it attenuated to a desired level.

Figure 18:
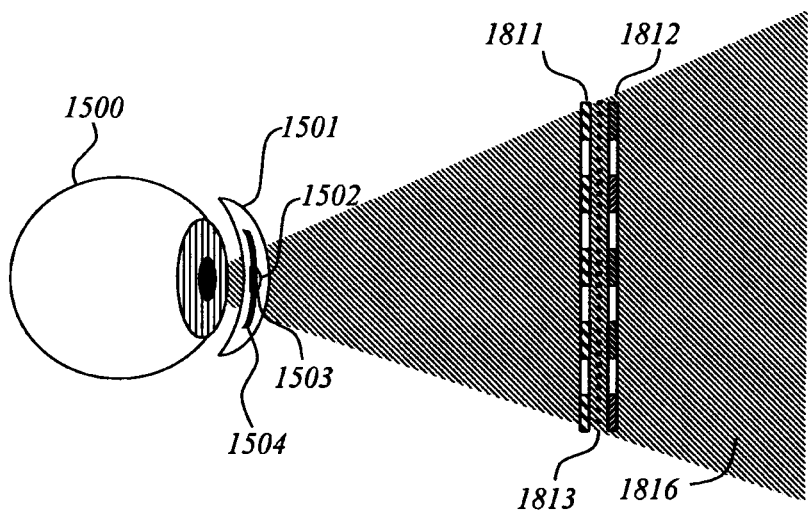
FIG. 18 is an illustration of an example configuration of a contact lens and an electroluminescent display panel that is polarized by an array of LCD pixels, in accordance with one embodiment of the present invention.

FIG. 18 illustrates an example configuration of a contact lens and an electroluminescent display panel that is polarized by an array of LCD pixels, in accordance with one embodiment of the present invention. Referring to FIG. 18, a viewer's eye 1500 is shown wearing a contact lens 1501 for viewing an electroluminescent display panel 1812 that is polarized by and array of LCD pixels 1811 while simultaneously viewing the surrounding ambient light 1816 visible through the display panel.

In the illustrated embodiment, some or all of the pixels in electroluminescent display panel 1812 emit light during a first time period. Light from the display panel 1812 of a first polarization passes through polarization filter 1813. For each pixel of display 1812 that is set to emit light, the corresponding pixel from LCD panel 1811 is set to not change the polarization of light passing through filter 1813. For each pixel of display 1812 that is not set to emit light, the corresponding pixel from LCD panel 1811 is set to change the polarization of light passing through filter 1813 to a second polarization.

Light 1816 of a first polarization also passes through polarization filter 1813, while light 1816 of a second polarization gets blocked. Light 1816 passing through LCD pixels 1811 is set to either the first polarization or the second polarization depending on the setting of LCD pixels 1811. Those pixels 1811 corresponding to illuminated pixels of display 1812 are set to pass light of a first polarization, while those pixels 1811 corresponding to non-illuminated pixels of display 1812 are set to pass light of a second polarization.

Light of the first polarization is blocked by filter 1504 everywhere except through the aperture in filter 1504. Light passing through the aperture of filter 1504 is substantially collimated by lenslet 1502. After passing through lenslet 1502, this light passes through filter 1503 and into the pupil, where it is imaged onto the retina by the eye's biological optics.

Light of the second polarization passes through filter 1504 and into the pupil, where it is imaged onto the retina by the eye's biological optics. Light of the second polarization passing through the center aperture is blocked by filter 1503.

The above discussion describes how light 1816 and light coming from display pixels 1812 make their way to the retina during a first time period. During a second time period, display pixels 1812 are turned off and LCD pixels 1811 are all set to pass light 1816 of the second polarization. During this second time period, all of the light 1816 of the second polarization passes through filter 1504 and is imaged onto the retina by the eye's biological optics.

During the first period, light 1816 passing through illuminated pixels 1812 is blocked from passing through filter 1504. This allows the illuminated pixels 1812 to be seen without having to over power the light 1816 from the surrounding environment.

The duty cycle between the first time period and the second time period can be controlled. By increasing the percentage of time allocated to the second time period, the attenuation of light 1816 is reduced while the attenuation of light from display pixels 1812 is increased. This variation of attenuation is only for light 1816 that passes through illuminated pixels 1812. Light 1816 passing through non-illuminated pixels 1812 is polarized to the second polarization in both time periods, and therefore is never attenuated.

Figure 19:
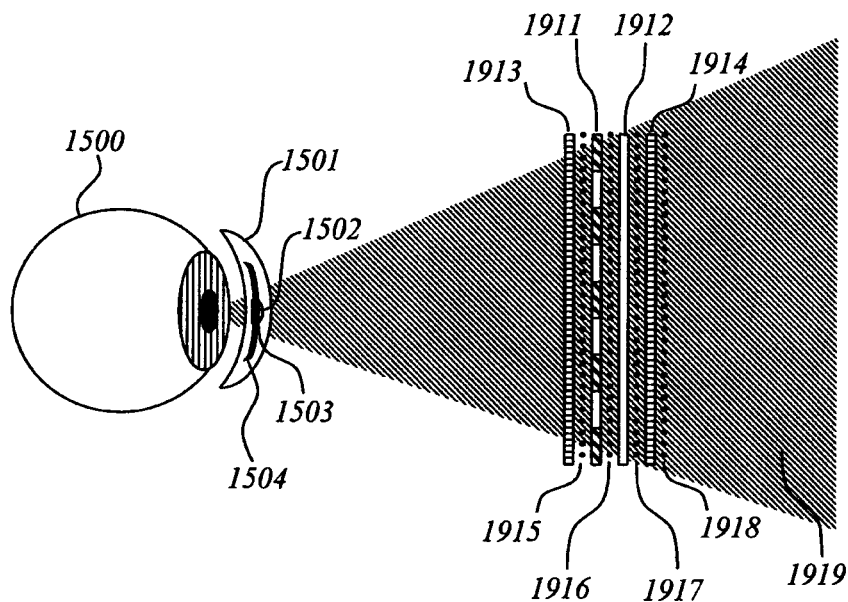
FIG. 19 is an illustration of an example configuration of a contact lens and an LCD panel that is backlit by an electroluminescent panel, in accordance with one embodiment of the present invention.

FIG. 19 shows an example configuration of a contact lens and an LCD panel that is backlit by an electroluminescent panel, in accordance with one embodiment of the present invention. Referring to FIG. 19, an observer's eye 1500 is shown wearing a contact lens 1501 for viewing an LCD panel 1911 that is backlit by an electroluminescent panel 1912 while simultaneously viewing the surrounding ambient light 1919 visible through the LCD display panel 1911.

Light from electroluminescent panel 1912 radiates out in all directions. It is polarized by polarizer 1916 prior to passing through LCD pixels 1911 and polarizer 1915. LCD pixels 1911 are set to adjust the amount of light from panel 1912 that can pass through polarizer 1915. Specifically, the LCD pixels 1911 may be set to pass all of the light passing through polarizer 1916, none of the light passing through polarizer 1916, or any gray level in between.

During a first period, LCD panel 1913 is set to pass light from panel 1912 polarized to an orientation that does not pass through polarizer filter 1504, but passes through filter 1503. Light from panel 1912 is prevented from being visible to an observer by polarizers 1917 and 1918 along with LCD panel 1914. During the first period when panel 1912 is on, LCD panel 1914 is set to not allow light to pass through polarizer 1918.

Polarizers 1917 and 1918 along with LCD panel 1914 are not required for the wearer to see the image created by LCD pixels 1911. Their main function is to prevent an observer from seeing the image created by LCD pixels 1911. Their second function is to block light 1919 from reaching the viewer's eyes during the first time period. Without items 1917, 1918, and 1914, light 1919 passes through panel 1912 and is processed just like the light from panel 1912, except that light 1919 is already substantially collimated by virtue of its distance from the eye. For this reason, center lenslet 1502 de-collimates this light causing it to be defocused on the retina by the eye's biological optics. This defocusing of light 1919 causes it to be highly diffused and therefore not affect the image created by LCD pixels 1911. Because of this, items 1917, 1918, and 1914 are not absolutely required to prevent light 1919 from interfering with the image created by LCD pixels 1911.

During a second time period, panel 1912 is turned off and LCD panel 1914 is set to pass light 1919 through polarizer 1917. Pixels 1911 are set to pass all of the light 1919 passing through polarizer 1916 to also pass through polarizer 1915. LCD panel 1913 is set to pass light 1919 polarized to an orientation that passes through polarizer filter 1504. From this point, it is focused onto the retina by the eye's normal biological optics. The portion of this light that passes through the aperture opening in filter 1504 is blocked by filter 1503.

The duty cycle between the first time period and the second time period can be controlled. By increasing the percentage of time allocated to the second time period, the amount of light 1919 imaged onto the retina is increased and the amount of light from panel 1912 that is modulated by LCD pixels 1911 imaged onto the retina is decreased. In this way, the relative brightness of the surrounding environment image and the display image can be optimized for a desired balance.

Figure 20:
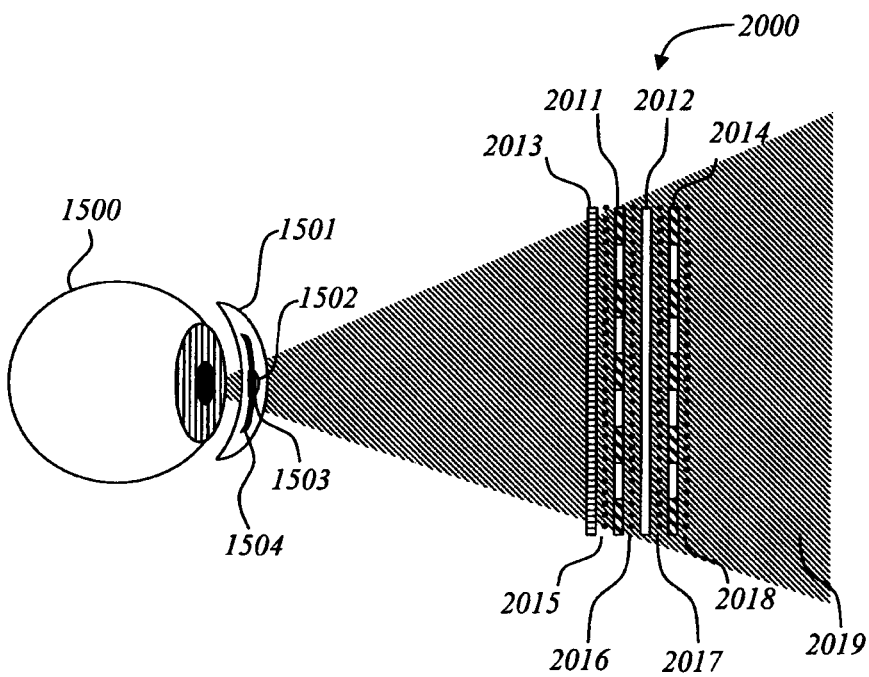
FIG. 20 is an illustration of an example configuration of a contact lens and an LCD panel that is backlit by an electroluminescent panel with a second LCD panel, in accordance with one embodiment of the present invention.

FIG. 20 shows an example configuration of a contact lens and an LCD panel that is backlit by an electroluminescent panel with a second LCD panel, in accordance with one embodiment of the present invention. Referring now to FIG. 20, a viewer's eye 1500 is shown wearing a contact lens 1501 for viewing an LCD panel 2011 that is backlit by an electroluminescent panel 2012 with a second LCD panel 2014 while simultaneously viewing the surrounding ambient light 2019 visible through the LCD display panel. The second LCD panel 2014 creates an image that is not visible to the wearer, but is visible to an observer.

The configuration of the display panel 2000 shown in FIG. 20 is similar to the operation described in FIG. 19, except an array of LCD pixels 2014 replaces the LCD panel 1914 of FIG. 19.

Light from electroluminescent panel 2012 radiates out in all directions. It is polarized by polarizer 2016 prior to passing through LCD pixels 2011 and polarizer 2015. LCD pixels 2011 are set to adjust the amount of light from panel 2012 that can pass through polarizer 2015. In particular, LCD pixels 2011 may be set to pass all of the light passing through polarizer 2016, none of the light passing through polarizer 2016, or any gray level in between.

During a first period, LCD panel 2013 is set to pass light from panel 2012 polarized to an orientation that does not pass through polarizer filter 1504, but passes through filter 1503.

During the first period, light from panel 2012 also passes through polarizer 2017 and is modulated by LCD pixels 2014 and polarizer 2018. LCD pixels 2014 are set to adjust the amount of light from panel 2012 that can pass through polarizer 2018. Specifically, the LCD pixels 2014 can be set to pass all of the light passing through polarizer 2017, none of the light passing through polarizer 2017, or any gray level in between. The image created by LCD pixels 2014 is visible to an observer.

During a second time period, panel 2012 is turned off and LCD pixels 2014 are set to pass light 2019 through polarizer 2017. Pixels 2011 are set to pass all of the light 2019 passing through polarizer 2016 to also pass through polarizer 2015. LCD panel 2013 is set to pass light 2019 polarized to an orientation that passes through polarizer filter 1504. From this point, it is focused onto the retina by the eye's normal biological optics. The portion of this light that passes through the aperture in filter 1504 is blocked by filter 1503.

The duty cycle between the first time period and the second time period can be controlled. By increasing the percentage of time allocated to the second time period, the amount of light 2019 imaged onto the retina is increased and the amount of light from panel 2012 that is modulated by LCD pixels 2011 imaged onto the retina is decreased. In this way, the relative brightness of the surrounding environment image and the display image can be optimized for a desired balance. This duty cycle control of relative brightness of the image from LCD pixels 2011 also affects the brightness of the image created by LCD pixels 2014 as seen by an observer.

In some embodiments, display panel 2000 may be viewable while not wearing contact lens 1501. If display panel 2000 is viewed from a distance by an observer on the left and an observer on the right, each observer would be able to see a display image while simultaneously seeing through the display to the surrounding environment on the other side of the display. The viewer to the left will see an image created during the first time period by LCD pixels 2011, whereas the viewer to the right will see an image created during the first time period by LCD pixels 2014. During the second time period, both viewers are able to see through the display to whatever is on the other side. Thus, the display panel 2000 appears like a see-through display to both viewers, but with a different display image presented. In this foregoing embodiment, LCD panel 2013 is not required.

Figure 21:
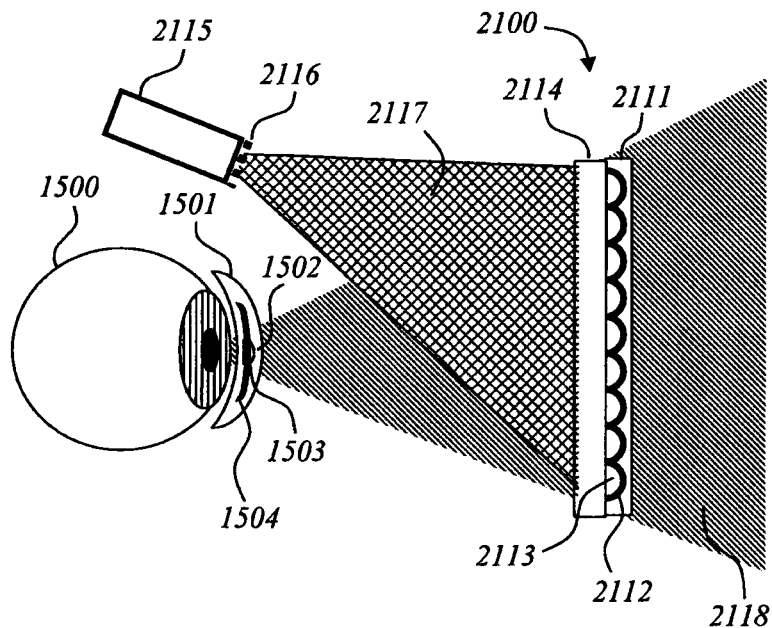
FIG. 21 is an illustration of an example configuration of a contact lens and an image projected onto a partially reflective panel, in accordance with one embodiment of the present invention.

FIG. 21 depicts an example configuration of a contact lens and an image projected onto a partially reflective panel, in accordance with one embodiment of the present invention. Referring to FIG. 21, a viewer's eye 1500 is shown wearing a contact lens for viewing an image projected by image projector 2115 onto a partially reflective panel 2100 while simultaneously viewing the surrounding ambient light 2118 visible through the partially reflective panel 2100.

As illustrated, transparent substrate 2111 is etched or molded to have concave or convex surfaces on one side. Partially reflective material is then deposited onto these surfaces to form partial reflectors 2112. A second transparent substrate 2114 is bonded to the first substrate 2111 by an optical adhesive 2113 that is substantially of the same coefficient of refraction as substrates 2111 and 2114. Adhesive 2113 completely fills the voids between reflectors 2112 and substrate 2114.

Reflective panel 2100 is constructed of substrate 2111, reflectors 2112, adhesive 2113, and substrate 2114 in such manner that the thickness of panel 2100 is substantially uniform in thickness and substantially uniform in its coefficient of refraction. As a result, light transmitting through partial reflective panel 2100 passes through without any refraction. However, light reflected by reflectors 2112 is reflected at various angles due to the curved nature of reflectors 2112. This allows a viewer to see the image projected by projector 2115 reflected off reflective surface 2112 from multiple viewing positions.

Depending on the embodiment, partial reflectors 2112 may be constructed using thin metallic films that are thin enough to transmit some light, yet thick enough to reflect some light. For example, aluminum having a thickness ranging from 200 to 3000 angstroms could be used to provide various degrees of reflectivity versus transmission. Partial reflectors 2112 may also be constructed by depositing Rugate coatings onto substrate 2111. Rugate coatings can be made to reflect certain wavelengths of light while transmitting other wavelengths. Yet other embodiments may use reflective polarizers for reflectors 2112. These reflectors reflect light of one polarization and transmit light of a second polarization.

Light 2117 from projector 2115 is projected onto reflective panel 2100. Some or all of this light is reflected by reflectors 2112 at divergent angles. The size of the curved surfaces of reflectors 2112 should be the same size as, or smaller than, the pixels projected onto panel 2100. Each pixel is then reflected in a diverging manner as if the light was emanating from the reflective surface. In this way, reflective panel 2100 appears as an image plane to the viewer. Optics and filters in contact lens 1501 enable the wearer to see the image being reflected by reflective panel 2100 even though it is placed very near to the wearer's eye.

In those embodiments where the reflective surface 2112 is a narrow band Rugate coating, only narrow bands of light from projector 2115 are reflected towards the viewer. In such an embodiment, filter 1504 may comprise a narrow band notch filter blocking the reflected light from entering the pupil except through the aperture opening at the center of filter 1504. The light passing through this aperture is substantially collimated by lenslet 1502 and passes through filter 1503 before entering the pupil. From there, the eye's biological optics focuses the light onto the retina. Additionally, narrow bandpass filter 2116 may be added to projector 2115 so that only narrow bands of light are projected onto narrow band reflectors 2111, thus preventing any projected light from being seen by an observer.

Broadband light 2118 from the surrounding environment predominantly passes through reflectors 2112 un-modified and illuminates the eye 1500 and contact lens 1501. Since it is broadband light, it mostly passes through the narrow band spectral notch filter 1504 and enters the pupil, where it is imaged onto the retina by the eye's biological optics. Light 2118 passing through lenslet 1502 is blocked from entering the pupil by filter 1503.

In those embodiments where the reflective surface 2112 is a polarization reflector, only light of a first polarization from projector 2115 is reflected towards the viewer. In such an embodiment, filter 1504 may comprise a polarization filter that blocks light of the first polarization and transmits light of a second polarization. In addition, polarization filter 2116 of a first polarization may be added to projector 2115 to only project light of the first polarization, so that no light transmits through reflectors to be seen by an observer.

Unpolarized light 2118 from the surrounding environment is polarized to a second polarization by reflectors 2112 and illuminates the eye 1500 and contact lens 1501. Light 2118 of the second polarization is transmitted through polarized filter 1504 and is focused onto the retina by the eye's biological optics.

In those embodiments where the reflective surface 2112 is a neutral partial reflector, the light from projector 2115 is conditioned by using filter 2116. Where filter 2115 is a narrow bandpass filter, filter 1504 is a narrow notch filter. Where filter 2115 is a polarization filter of a first polarity, filter 1504 is a polarization filter of a second polarization. Either way, light from projector 2115 is conditioned by filter 2116 and partially reflected by reflectors 2112 back to the viewer's eye. The light from projector 2115 is then blocked from entering the pupil by filter 1504 everywhere except through the center aperture opening. The light passing through the center aperture opening is substantially collimated by lenslet 1502 and passes through filter 1503. It then enters the pupil and is imaged onto the retina by the eye's biological optics.

Some of light 2118 from the surrounding environment transmits through partial reflectors 2112 and illuminates the eye 1500 and contact lens 1501. It passes through filter 1504 into the pupil, where it is imaged onto the retina by the eye's biological optics.

Figure 22:
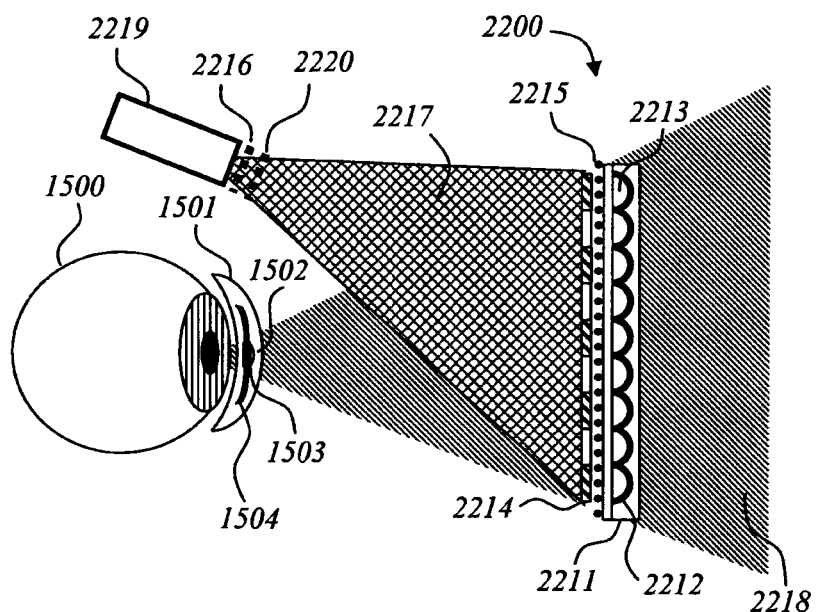
FIG. 22 is an illustration of an example configuration of a contact lens and an LCD panel that is illuminated by light projected onto a partially reflective back panel, in accordance with one embodiment of the present invention.

FIG. 22 shows an example configuration of a contact lens and an LCD panel that is illuminated by light projected onto a partially reflective back panel, in accordance with one embodiment of the present invention. Referring to FIG. 22, a viewer's eye 1500 is shown wearing a contact lens 1501 for viewing an LCD panel 2200 that is illuminated by light 2217 from light source 2219 projected onto a partial reflector 2212 while simultaneously viewing the surrounding ambient light 2218 visible through the LCD display panel 2200.

Transparent substrate 2211 is etched or molded to have concave or convex surfaces on one side. Partially reflective material is then deposited onto these surfaces to form partial reflectors 2212.

A polarizer 2215 is bonded to substrate 2211 by an optical adhesive 2213 that is substantially of the same coefficient of refraction as substrate 2211. Adhesive 713 completely fills the voids between reflectors 2212 and polarizer 2215.

The reflective panel is constructed of substrate 2211, reflectors 2212, adhesive 2213, and polarizer 2215 in such manner that the thickness of LCD display panel 2200 is substantially uniform in thickness and substantially uniform in its coefficient of refraction. As a result, light transmitting through LCD display panel 2200 passes through without any refraction. However, illumination light 2217 from light source 2219 is reflected off reflectors 2212 at various angles due to the curved nature of reflectors 2212. This allows a viewer to see the reflected light from multiple angles.

Partial reflectors 2212 can be constructed using thin metallic films that are thin enough to transmit some light, yet thick enough to reflect some light. For example, aluminum having a thickness ranging from 200 to 3000 angstroms could be used as it provides various degrees of reflectivity versus transmission. In other embodiments, partial reflectors 2212 may be constructed by depositing Rugate coatings onto substrate 2211. Rugate coatings can be made to reflect certain wavelengths of light while transmitting other wavelengths.

Light 2217 from light source 2219 is illuminated onto reflective surface 2212 after passing through polarizer 2216, LCD pixels 2214, and polarizer 2215. LCD pixels 2214 modulate the gray levels of light transmitted through polarizer 2215 and on to reflective surface 2212. This modulation of individual pixels forms an image. Some or all of this light is reflected by reflectors 2212 at divergent angles back through polarizer 2215 and LCD pixels 2214. The size of the curved surfaces of reflectors 2212 should be the same size or smaller as LCD pixels 2214. Each pixel is reflected in a diverging manner as if the light was emanating from the reflective surface.

Optics and filters in contact lens 1501 enable the wearer to see the image being reflected by reflective surface 2212 even though it is placed very near to the wearer's eye.

In those embodiments where the reflective surface 2212 is a narrow band Rugate coating, only narrow bands of light from light source 2219 are reflected towards the viewer. Filter 1504 blocks the reflected light from entering the pupil except through the aperture opening at the center of filter 1504. The light passing through this aperture is substantially collimated by lenslet 1502 and passes through filter 1503 before entering the pupil. From there, the eye's biological optics focus the light onto the retina.

Optionally, narrow bandpass filter 2220 can be added to light source 2219 so that only narrow bands of light are projected onto narrow band reflectors 2211, thereby preventing any projected light from being seen by an observer.

Broadband light 2218 from the surrounding environment mostly passes through reflectors 2212 un-modified. Polarizer 2215 polarizes light 2218 and LCD pixels 2214 alter this polarization orientation, without modulating the intensity of light 2218. After passing through LCD pixels 2214, light 2218 illuminates the eye 1500 and contact lens 1501. Since it is broadband light, it mostly passes through the narrow band spectral notch filter 1504 and enters the pupil, where it is imaged onto the retina by the eye's biological optics. Light 2218 passing through lenslet 1502 is blocked from entering the pupil by filter 1503.

In some embodiments, partial reflectors 2212 may be neutral filters rather than narrow band spectral filters. In such embodiments, the light 2217 is still a narrow band light. Some of this narrow band light 2217 from light source 2219 is partially reflected by reflectors 2212 back to the viewer's eye and is blocked from entering the pupil by RGB notch filter 1504 except through the center aperture opening. The light passing through the center aperture opening is substantially collimated by lenslet 1502 and passes through filter 1503. It then enters the pupil, where it is imaged onto the retina by the eye's biological optics.

Some of light 2218 from the surrounding environment is transmitted through partial reflectors 2212 and illuminates the eye 1500 and contact lens 1501. It passes through notch filter 1504 into the pupil, where it is imaged onto the retina by the eye's biological optics.

Figure 23:
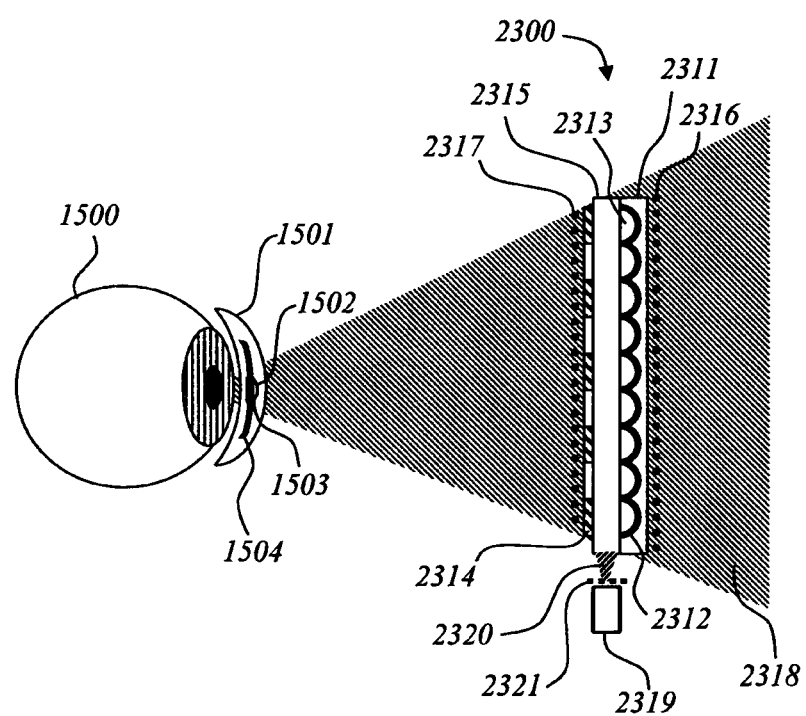
FIG. 23 is an illustration of an example configuration of a contact lens and an LCD panel that is side-illuminated through a light spreader, in accordance with one embodiment of the present invention.

FIG. 23 illustrates an example configuration of a contact lens and an LCD panel that is side-illuminated through a light spreader in accordance with one embodiment of the present invention. Referring to FIG. 23, a viewer's eye 1500 is shown wearing a contact lens 1501 for viewing an LCD panel 2300 that is side-illuminated through a light spreader 2315 while simultaneously viewing the surrounding ambient light 2318 visible through the LCD display panel 2300.

Transparent substrate 2311 is etched or molded to have concave or convex surfaces on one side. Partially reflective material is then deposited onto these surfaces to form partial reflectors 2312.

Light spreader 2315 is bonded to the first substrate 2311 by an optical adhesive 2313 that is substantially of the same coefficient of refraction as substrates 2311 and 2315. Adhesive 2313 completely fills the voids between reflectors 2312 and substrate 2315.

The reflective panel is constructed of substrate 2311, reflectors 2312, adhesive 2313, and light spreader 2315 in such manner that the thickness of panel 2300 is substantially uniform in thickness and substantially uniform in its coefficient of refraction. As a result, light transmitting through LCD panel 2300 passes through without any refraction. However, light reflected by reflectors 2312 is reflected at various angles due to the curved nature of reflectors 2312. This allows a viewer to see the reflected light from multiple angles.

In some embodiments, partial reflectors 2312 may be constructed using thin metallic films that are thin enough to transmit some light, yet thick enough to reflect some light. For example, aluminum having a thicknesses ranging from 200 to 3000 angstroms could be used as it provides various degrees of reflectivity versus transmission. In other embodiments, partial reflectors 2312 may also be constructed by depositing Rugate coatings onto substrate 2311. Rugate coatings can be made to reflect certain wavelengths of light while transmitting other wavelengths.

Light 2320 from light source 2319 is illuminated onto reflective surface 2312 after passing through polarizer 2321 of a first polarization and being spread out uniformly by light spreader 2315. LCD pixels 2314 modulate the gray levels of light transmitted through polarizer 2317. This modulation of individual pixels forms an image.

Optics and filters in contact lens 1501 enable the wearer to see the image generated by LCD panel 2300 even though it is placed very near to the wearer's eye.

In those embodiments where the reflective surface 2312 is a narrow band Rugate coating, only narrow bands of light from light source 2319 are reflected towards the viewer. In such embodiments, filter 1504 is a narrow band notch filter blocking the reflected light from entering the pupil except through the aperture opening at the center of filter 1504. The light passing through this aperture is substantially collimated by lenslet 1502 and passes through filter 1503 before entering the pupil. From there, the eye's biological optics focuses the light onto the retina.

Broadband light 2318 from the surrounding environment passes through polarizer 2316 of a second polarization and then mostly passes through reflectors 2312 un-modified. Since light 2318 is now polarized to a second polarization, LCD pixels 2314 modulate its gray levels in the negative of the gray levels for light 2319. Thus, the bright pixels from light 2319 correspond to dim pixel of light 2318 and vice versa.

The pixel modulated light 2318 illuminates the eye 1500 and contact lens 1501. Since it is broadband light, it mostly passes through the narrow band spectral notch filter 1504 and enters the pupil, where it is imaged onto the retina by the eye's biological optics. Light 2318 passing through lenslet 1502 is blocked from entering the pupil by filter 1503.

In some embodiments, partial reflectors 2312 may be neutral filters rather than narrow band spectral filters. In such embodiments, the light 2320 is still narrow band light. Some of this narrow band light 2320 from light source 2319 is partially reflected by reflectors 2312 back to the viewer's eye and is blocked from entering the pupil by RGB notch filter 1504, except through the center aperture opening. The light passing through the center aperture opening is substantially collimated by lenslet 1502 and passes through filter 1503. It then enters the pupil, where it is imaged onto the retina by the eye's biological optics.

Some of light 2318 from the surrounding environment is transmitted through partial reflectors 2312 and illuminates the eye 1500 and contact lens 1501. It passes through notch filter 1504 into the pupil, where it is imaged onto the retina by the eye's biological optics.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A display panel assembly, comprising:
    an electro-luminescent display that is transparent;
    a liquid crystal display that is transparent and segmented, wherein the liquid crystal display is mounted to the electro-luminescent display such that a segment of the liquid crystal display is substantially aligned with one or more pixels within the electro-luminescent display; and
    a control mechanism that varies a liquid crystal pixel gray level for the segment in order to modify an amount of ambient light passed through the electro-luminescent display.

2. A display panel assembly, comprising:
    an electro-luminescent display that is transparent;
    a liquid crystal display that is transparent and segmented, wherein the liquid crystal display is mounted to the electro-luminescent display such that a segment of the liquid crystal display is substantially aligned with one or more pixels within the electro-luminescent display; and
    a control mechanism that varies a liquid crystal pixel gray level for the segment in order to modify an amount of ambient light passed through the electro-luminescent display, wherein the electro-luminescent display comprises an organic light emitting diode display.

3. A display panel assembly, comprising:
    an electro-luminescent display that is transparent;
    a liquid crystal display that is transparent and segmented, wherein the liquid crystal display is mounted to the electro-luminescent display such that a segment of the liquid crystal display is substantially aligned with one or more pixels within the electro-luminescent display; and
    a control mechanism that varies a liquid crystal pixel gray level for the segment in order to modify an amount of ambient light passed through the electro-luminescent display, wherein an algorithm modifies the liquid crystal pixel gray level based on a content of the electro-luminescent display.

4. A display panel assembly, comprising:
    an electro-luminescent display that is transparent;
    a liquid crystal display that is transparent and segmented, wherein the liquid crystal display is mounted to the electro-luminescent display such that a segment of the liquid crystal display is substantially aligned with one or more pixels within the electro-luminescent display; and
    a control mechanism that varies a liquid crystal pixel gray level for the segment in order to modify an amount of ambient light passed through the electro-luminescent display, wherein an algorithm modifies the liquid crystal pixel gray level based on a brightness of the one or more pixels within the electro-luminescent display.

5. A display panel assembly, comprising:
    an electro-luminescent display that is transparent;
    a liquid crystal display that is transparent and segmented, wherein the liquid crystal display is mounted to the electro-luminescent display such that a segment of the liquid crystal display is substantially aligned with one or more pixels within the electro-luminescent display; and
    a control mechanism that varies a liquid crystal pixel gray level for the segment in order to modify an amount of ambient light passed through the electro-luminescent display, wherein an algorithm modifies the liquid crystal pixel gray level based on a color of the one or more pixels within the electro-luminescent display.

6. A display panel assembly, comprising:
an electro-luminescent display that is transparent;
a liquid crystal display that is transparent and segmented, wherein the liquid crystal display is mounted to the electro-luminescent display such that a segment of the liquid crystal display is substantially aligned with one or more pixels within the electro-luminescent display; and
a control mechanism that varies a liquid crystal pixel gray level for the segment in order to modify an amount of ambient light passed through the electro-luminescent display, wherein an algorithm modifies the liquid crystal pixel gray level based on a gaze angle of an eye of a viewer.

7. A display panel assembly, comprising:
an electro-luminescent display that is transparent;
a liquid crystal display that is transparent and segmented, wherein the liquid crystal display is mounted to the electro-luminescent display such that a segment of the liquid crystal display is substantially aligned with one or more pixels within the electro-luminescent display; and
a control mechanism that varies a liquid crystal pixel gray level for the segment in order to modify an amount of ambient light passed through the electro-luminescent display, wherein an algorithm modifies the liquid crystal pixel gray level based on time periods.

8. A display panel assembly, comprising:
a transparent display panel having a viewable side, the transparent display panel comprising a display pixel;
a polarizer affixed to the viewable side;
a transparent pixelated liquid crystal array affixed to the polarizer, the transparent pixelated liquid crystal array comprising at least one liquid crystal pixel that substantially aligns to the display pixel; and
a control mechanism configured to electrically control the transparent display and the transparent pixelated liquid crystal array, wherein in a first time period, the control mechanism sets the display pixel to a predetermined brightness level and sets the liquid crystal pixel to a first orientation at every location where a display pixel is set to at least partially illuminated, and in a second time period, the control mechanism sets the display pixel to emit no light and sets the liquid crystal pixel to a second orientation.

9. A display panel assembly, comprising:
a transparent electroluminescent panel having a first electroluminescent panel side and second electroluminescent panel side;
a first transparent pixelated liquid crystal array having a first array side and a second array side, wherein a polarizer is affixed to both the first and second array sides, and the second array side with the polarizer is affixed to the first electroluminescent panel side, and;
a first transparent liquid crystal shutter panel having a first shutter panel side and a second shutter panel side, wherein the second shutter panel side is affixed to the first array side; and
a first control mechanism configured to electrically control the transparent electroluminescent panel, the first transparent pixelated liquid crystal array, and first transparent liquid crystal shutter panel, wherein in a first time period, the control mechanism sets the first transparent liquid crystal shutter to a first polarization orientation and sets the first transparent pixelated liquid crystal array to a first gray level orientation proper for forming a desired image, and in a second time period, the control mechanism turns off the transparent electroluminescent panel and sets the first transparent liquid crystal shutter panel to a second polarization orientation.

10. The display panel assembly of claim 9, further comprising:
a second transparent liquid crystal shutter panel affixed to the second electroluminescent panel side, wherein a polarizer is affixed to both sides of the second transparent liquid crystal shutter panel; and
a second control mechanism configured to electrically control the second transparent liquid crystal shutter panel, wherein in a third time period, the second transparent liquid crystal shutter panel is set to block light from transmitting, and in a fourth time period, the second transparent liquid crystal shutter panel is set to allow light to transmit.

11. The display panel assembly of claim 9, further comprising:
a second transparent pixelated liquid crystal array affixed to the second electroluminescent panel side, wherein a polarizer is affixed to both sides of the second transparent pixelated liquid crystal array; and
a second control mechanism configured to electrically control the second transparent pixelated liquid crystal array, wherein in a third time period, the second transparent pixelated liquid crystal array is set to a second gray level orientation proper for forming a second desired image, and in a fourth time period, the second transparent pixelated liquid crystal array is set to allow light to transmit.

12. The display panel assembly of claim 9, wherein the transparent electroluminescent panel comprises a multi-color array that substantially aligns to pixels in the first transparent pixelated liquid crystal array.

13. The display panel assembly of claim 9, wherein the transparent electroluminescent panel comprises a plurality of colored transparent electroluminescent panels, and the first time period comprises a plurality of sub-periods such that: each colored transparent electroluminescent panel is of a different color, each colored transparent display is turned on during a different sub-period, and the first transparent liquid crystal shutter panel is set to a different orientation during each sub-period.

* * * * *